US006666155B2

(12) United States Patent
Paluch et al.

(10) Patent No.: US 6,666,155 B2
(45) Date of Patent: Dec. 23, 2003

(54) PLANTER WITH CENTRALLY MOUNTED COULTER APPARATUS

(75) Inventors: Paul M. Paluch, Downers Grove, IL (US); Leonard A. Bettin, La Grange Park, IL (US)

(73) Assignee: Case, LLC, Racine, WI (US)

( * ) Notice: Subject to any disclaimer, the term of this patent is extended or adjusted under 35 U.S.C. 154(b) by 0 days.

(21) Appl. No.: 10/090,538

(22) Filed: Mar. 4, 2002

(65) Prior Publication Data

US 2003/0164126 A1 Sep. 4, 2003

(51) Int. Cl.[7] ............................................. A01B 63/02
(52) U.S. Cl. ........................... 111/54; 111/57; 111/66; 172/662; 172/776; 172/311; 172/452
(58) Field of Search .................. 172/458, 452, 172/311, 662, 474, 317, 310, 456, 675, 776; 111/54, 52, 53, 55, 57, 59, 60, 66

(56) References Cited

U.S. PATENT DOCUMENTS

| 5,113,956 A | | 5/1992 | Friesen | 172/311 |
|---|---|---|---|---|
| 5,161,622 A | * | 11/1992 | Godbersen | 172/140 |
| 5,429,195 A | * | 7/1995 | Turnis | 172/311 |
| 6,205,937 B1 | * | 3/2001 | Shoup | 111/54 |
| 6,321,852 B1 | * | 11/2001 | Pratt | 172/452 |

* cited by examiner

Primary Examiner—Christopher J. Novosad
(74) Attorney, Agent, or Firm—Brant T. Maurer; Rebecca Henkel

(57) ABSTRACT

A planter/fertilizer assembly that can be configured to facilitate either rapid seeding/fertilizing or transport and including an implement bar mounted on a wheel supported carrier frame for rotation between a transport position where the implement bar is parallel to a transport direction and an operating position where the implement bar is perpendicular to the transport direction, row units mounted to the implement bar on a side opposite the wheels and including central units adjacent the wheels and lateral units disposed laterally of the wheels, lateral coulter/fertilizer units mounted to the lateral row units, a coulter bar mounted to an underside of the carrier frame on a side opposite the support wheels and a separate coulter/fertilizer unit mounted to the coulter bar and aligned with each of the central row units.

17 Claims, 25 Drawing Sheets

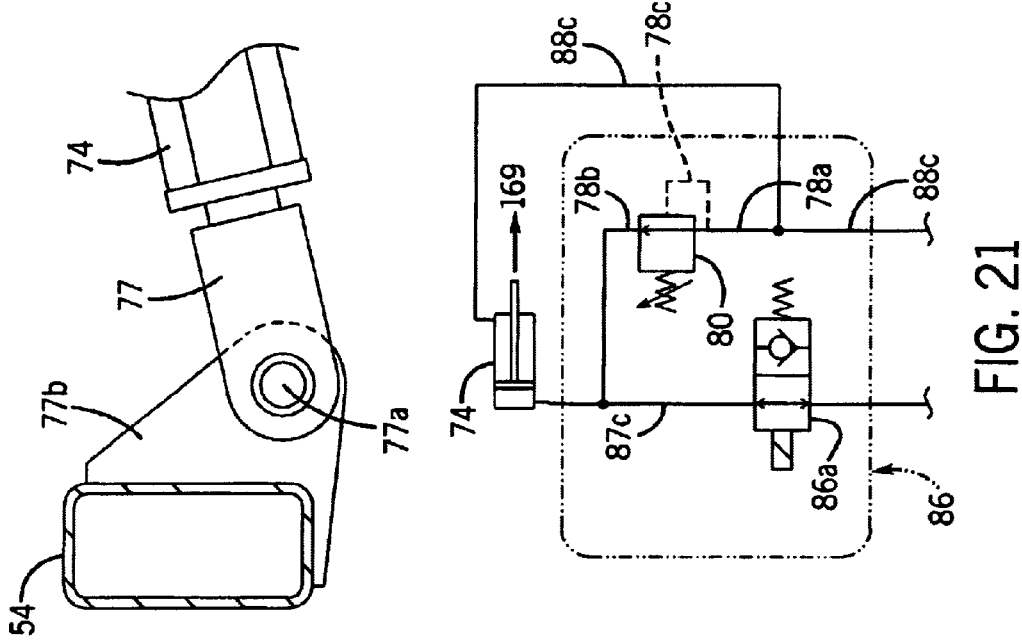
FIG. 14
FIG. 21
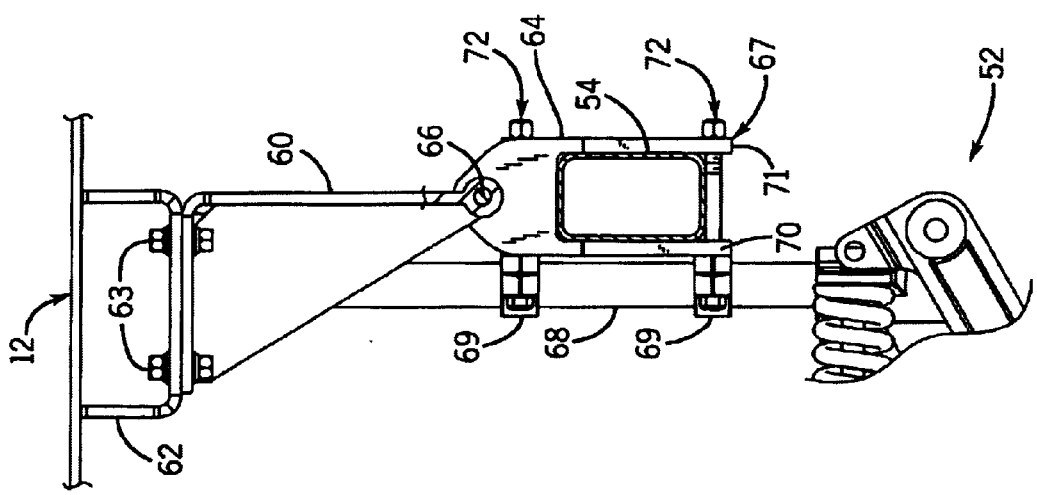
FIG. 13

PLANTER WITH CENTRALLY MOUNTED COULTER APPARATUS

CROSS-REFERENCE TO RELATED APPLICATIONS

Not applicable.

FIELD OF THE INVENTION

The present invention relates generally to agricultural equipment and more specifically to a coulter overload protection apparatus for use with a planter assembly.

BACKGROUND OF THE INVENTION

An exemplary agricultural planter assembly may includes support wheels centrally mounted to a long (e.g., 40 feet) implement bar with a tongue member extending centrally from the support wheels to a hitch on a tractor or some other type of prime mover and a plurality (e.g., sixteen) of separate coulter/fertilizer units and corresponding row units. Hereinafter, unless indicated otherwise and in the interest of simplifying this explanation, an exemplary planter assembly including a forty foot long implement bar and sixteen row units and corresponding coulter/fertilizer units will be assumed.

Each coulter/fertilizer unit is typically mounted to a front end of a corresponding row unit and includes a coulter or cutting knife member that cuts a fertilizer trench in soil there below and a fertilizer dispensing tube that delivers fertilizer into the fertilizer trench. The row units are mounted to the implement bar in an equi-spaced configuration. An exemplary row unit includes a seed bin, a dispenser and some type of soil agitator (e.g., a coulter or knife assembly). During operation, the agitators are forced into the ground and form seed trenches.

Each bin is mounted above a corresponding dispenser and feeds seed to the dispensers via gravity. The dispensers open behind corresponding agitators and drop seed into the seed trenches. The coulter/fertilizer units and corresponding row units are typically offset somewhat (e.g., 2 inches) so that the seed and fertilizer trenches are separated so that the fertilizer does not "burn" the seed as well known in the art. Once the seed sprouts, new plant roots make there way into the fertilizer trenches and growth is enhanced.

Typically the implement bar is moveable between an upright position where the ground engaging components of the row units and coulter/fertilizer units are raised above the ground for transport and a ground engaging position where the units can be activated to trench and fertilize and seed, respectively. Here the motive force for moving the implement bar between the upright and ground engaging positions may be either hydraulic or mechanical.

While a long implement bar and corresponding large number of row units and coulter/fertilizer units is advantageous during a planting operation (e.g., more row units translate into less time to perform a planting operation), long implement bars are difficult to accommodate during machine transport between fields, about a farmers property and during storage. To accommodate optimal transport and operating planter configurations, the industry has developed several different folding or pivoting implement bar configurations. One such pivoting configuration (hereinafter "the pivoting assembly") is described in U.S. patent application Ser. No. 10/062,612 which is entitled "Planter Hitch Apparatus" was filed on Jan. 31, 2002 and which is incorporated herein, in its entirety, by reference. The pivoting assembly includes an implement bar and other components mounted to a mainframe assembly.

Hereinafter, unless indicated otherwise, when the implement bar is referenced, it will be assumed that the reference includes the implement bar and all other attached assembly components including the row units, the coulter/fertilizer units, etc. and when the implement bar weight is referenced it will be assumed that the implement bar weight reference corresponds to the combined weight of the implement bar and all attached components. In addition, unless indicated otherwise, when the mainframe is referenced, it will be assumed that the reference includes the mainframe and all other attached assembly components including the implement bar, the row units, the coulter/fertilizer units, etc. and when the mainframe weight is referenced it will be assumed that the mainframe weight reference corresponds to the combined weight of the mainframe and all attached components.

The pivoting assembly includes a carrier assembly having a carrier frame and a platform. The platform is mounted to a top surface of the carrier frame and the carrier frame has a width that should be relatively stable during operation and yet is limited to a dimension suitable for transport purposes. For instance, the width dimension may be 10 to 12 feet for a planter assembly including a 40 foot implement bar. Support wheels are mounted to the underside of the carrier frame along a single axis and proximate a rear edge of the carrier platform with at least one wheel proximate each end of the carrier frame width dimension so that the wheels provide stable support for the carrier frame and carrier platform there above. The mainframe is pivotally mounted to a rear side corner of a carrier platform so that the mainframe and implement bar attached thereto can be positioned perpendicular to the transport direction during operation and parallel to the transport direction during transport.

A roller or wheel assembly is spaced apart from the pivot and mounted to the underside of the mainframe to ease the conversion process between the transport and operating positions and to provide support to the mainframe and attached implement bar.

In addition, to support the implement bar when in the operating position, lateral support wheels are mounted to the distal ends of the implement bar that can be extended to engage the ground there below or can be retracted during conversion between the implement bar positions and during transport.

Whenever a wheel supported planter assembly is going to be attached to a tractor hitch for transport and operation, ideally the planter assembly is configured such that the implement assembly load is relatively balanced across the support wheels but has some positive hitching weight so that the assembly remains stable during transport. Here, as the phrase implies, positive hitch weight is caused by configuration weight disposed between the support wheels and a tractor hitch which tends to bear down on the hitch. Where positive hitch weight is to great some tractors may have difficulty moving a hitched planter assembly. Similarly, as the phrase implies, negative hitch weight is caused by configuration weight disposed on a side of the support wheels opposite the hitch and tends to tip the assembly tongue upward away from the hitch.

In the case of the pivoting assembly described above, it has been determined that, to best balance the implement assembly load across the support wheels in both the transport and operating positions, the implement bar and row units should be mounted such that, when the implement bar is in the operating and upright position (i.e., extends perpendicular to the transport direction with the row units in the upright position), the bar (and attached row units) is generally behind the support wheels. With the row units and bar mounted in this manner, when the implement bar is upright and in the operating position, the weight of the implement bar and the hitch and carrier platform together provide a stabilizing positive weight that is somewhat balanced in front of and behind the support wheels, the possibility of negative weight is minimal, the implement bar weight is essentially balanced on either lateral side of the wheels and is supported generally evenly across the pivot point and the roller assembly. In addition, when the implement bar is in the transport position (and hence is necessarily upright), the weight of the implement bar and attached components is greater in front than it is behind the support wheel axis, the overall positive weight is stable and yet not to great, the implement bar is positioned above the carrier platform and the implement bar weight is essentially evenly laterally distributed above the platform.

Unfortunately, when the implement bar and row units are optimally juxtaposed behind the support wheels, the wheels make it impossible to attach coulter/fertilizer units to the front ends of some of the row units. For instance, assume that a planter assembly includes 16 separate row units with six central units directly behind the platform and support wheels and five lateral units to either side of the six central units. In this case, while coulter/fertilizer units can be attached to the front ends of the ten lateral units (i.e., five lateral units on either side of the central units), the wheels are in the space required to attach the coulter/fertilizer units to the six central row units.

Therefore, it would be advantageous to have a planter assembly that includes a separate coulter/fertilizer unit positioned in front of each row unit where the assembly is pivotal to facilitate conversion between operating and transport positions.

SUMMARY OF THE INVENTION

It has been recognized that a coulter/fertilizer assembly can be attached to the underside of the carrier frame in front of the support wheels where the assembly includes a separate coulter/fertilizer unit for and aligned with each of the central row units. To this end, the coulter/fertilizer assembly in at least one embodiment includes a coulter bar mounted to the underside of the carrier frame that extends along the width of the carrier frame in front of the support wheels. A separate coulter/fertilizer units is mounted to the coulter bar in front of each of the central row units with the same fertilizer-seeding offset described above. Additional coulter/fertilizer units are mounted to the front ends of the lateral row units on either side of the central units. The coulter/fertilizer units mounted to the coulter bar will be referred to hereinafter as central coulter units and the coulter/fertilizer units mounted to the front ends of the lateral row units will be referred to hereinafter as lateral coulter/fertilizer units Typically, like the implement bar, the coulter bar will be constructed such that it can be moved between a ground engaging position wherein the coulter/fertilizer units facilitate fertilization and an upright position wherein the coulter/fertilizer units are stored above ground for transport. While the coulter/fertilizer assembly may be constructed such that the coulter bar is manually moveable between the upright and ground engaging positions, in some embodiments the coulter bar may be pivotally mounted to the carrier frame and linked to a hydraulic cylinder. In some embodiments, when the cylinder is extended the coulter bar is moved to the upright position and when the cylinder is retracted the coulter bar is driven toward the ground engaging position.

One problem with coulter/fertilizer units is that the coulters can become damaged if too much force is applied thereto. For instance, if a coulter contacts a rock while being pulled through a field, the slicing edge of the coulter may be damaged or, in some cases, even destroyed.

In the case of the lateral coulter/fertilizer units (i.e., in the present example, to the five row units on either side of the central row units and proximate the ends of the implement bar), the implement bar has been known to flex somewhat such that, when a coulter contacts a large rock or the like, the implement bar absorbs some of the impacting force and the coulter is forced over the rock thereby minimizing coulter damage.

Unfortunately, because the coulter bar is relatively short, the coulter bar does not appreciably flex and therefore cannot absorb much force that is applied to the central coulter unit coulters. Thus, the central coulter unit coulters that are linked to the relatively inflexible coulter bar are far more susceptible to damage than the coulters linked to the flexible implement bar.

To protect the central coulter units, at least one embodiment of the invention includes an overload protection mechanism that, when the force on the central coulter units exceeds a preset threshold force, reduces the force on the central coulter units by allowing the coulter bar to pivot toward the upright or transport position. Here, the threshold force level is selected to be less than the a force level that will likely cause coulter damage.

Consistent with the above discussion, one embodiment of the invention includes a coulter apparatus for use with a planter assembly constructed to move is a transport direction where the planter assembly includes support wheels mounted to the underside of a carrier frame and row units linked to the carrier frame and generally disposed on a side of the support wheels opposite the transport direction, the apparatus comprising a separate coulter/fertilizer unit mounted to the underside of the carrier frame and aligned with each one of the row units on a side of the support wheels opposite the row units.

In some embodiments each coulter/fertilizer unit includes a ground engaging coulter member, adjacent support wheels form wheel spaces there between and the coulter units linked such that, for each space, a line parallel to the transport direction and intersecting at least one coulter unit passes through the space.

Some embodiments further include a coulter bar mounted to the underside of the carrier frame wherein the coulter/fertilizer units are mounted to the coulter bar. The coulter/fertilizer units may be essentially equi-spaced.

The coulter bar may be pivotally mounted to the underside of the carrier frame so that the coulter bar can be moved between a transport position where the coulter/fertilizer units are above the ground and a functional position where the coulter/fertilizer units engage the ground. More specifically, the apparatus may further include a hydraulic cylinder mounted to the carrier frame and including a rod mounted to the coulter bar, the cylinder for moving the coulter bar between the upright and downward positions. Even more specifically the row units may be linked to the carrier frame for pivotal movement between transport and functional positions, the hydraulic cylinder may be a first cylinder and the planter assembly may further include a second hydraulic cylinder linked between the carrier frame and the row units for moving the row units between the functional and transport positions and, wherein, the first and second cylinders may be plumbed in parallel so that the coulter/fertilizer bar and row units essentially simultaneously move between the functional and transport positions.

In some embodiments the cylinder is mounted to the carrier frame on a side of the coulter bar opposite the support wheels and the coulter bar pivots toward the support wheels when moving from the functional to the transport positions. Here, the support wheels may define a support dimension and the coulter bar may have a length dimension that is similar to the support dimension.

In several embodiments the planter assembly further includes an implement bar having a length dimension that is greater than the support dimension, the implement bar mounted to the carrier frame such that ends of the implement bar extend laterally past the wheels, implement bar portions extending past the wheels being lateral bar segments and the implement bar portion adjacent the support dimension being a central bar segment, the row units mounted to the implement bar and including central and lateral row units mounted to the central and lateral bar segments, respectively, the planter assembly further including a separate coulter/fertilizer unit mounted to each of the lateral row units on a side facing the coulter bar, the coulter/fertilizer units mounted to the coulter bar including only one unit corresponding to each of the central row units. Here, the implement bar may be pivotally mounted to the carrier frame such that the implement bar is pivotable between an operating position where the implement bar is perpendicular to the transport direction and a transport position wherein the implement bar is parallel to the transport position.

The invention also includes a planter assembly constructed to move in a transport direction, the assembly comprising a carrier frame, support wheels mounted to the underside of the carrier frame along a single axis and defining a support dimension along the single axis, an implement bar having a length dimension that is greater than the support dimension and mounted to the carrier frame generally on a side opposite the transport direction such that ends of the implement bar extend laterally past the wheels, implement bar portions extending past the wheels being lateral bar segments and the implement bar portion adjacent the support dimension being a central bar segment, row units including central and lateral row units mounted to the central and lateral segments of the implement bar, respectively, a separate coulter/fertilizer unit mounted to each of the lateral row units on a side facing the transport direction, a coulter bar mounted to the underside of the carrier frame on a side of the support wheels opposite the implement bar and a separate coulter/fertilizer unit corresponding to each of the central row units mounted to the coulter bar and aligned with a corresponding central row unit.

In some embodiments the coulter bar is mounted to the carrier frame for pivotal movement between a functional position where the coulter/fertilizer units are juxtaposed for ground engagement and a transport position wherein the coulter/fertilizer units are positioned above the ground. In some embodiments the assembly further includes a hydraulic cylinder mounted between the coulter bar and the carrier frame for moving the coulter bar between the functional and transport positions. Here, the cylinder may be mounted to the carrier frame on a side of the coulter bar opposite the support wheels.

The implement bar may be mounted to the carrier frame for pivotal movement between a functional position where the row units are juxtaposed for ground engagement and a transport position wherein the row units are positioned above the ground, the cylinder being a first hydraulic cylinder, the assembly further including a second hydraulic cylinder mounted between the implement bar and the carrier frame for moving the implement bar between the functional and transport positions. Here, the first and second cylinders may be plumbed in parallel.

In some embodiments the implement bar is mounted to the carrier frame for pivotal movement between a transport position where the implement bar is parallel to the transport direction and an operating position where the implement bar is perpendicular to the transport position.

The invention further includes a planter assembly constructed to move in a transport direction, the assembly comprising a carrier frame, support wheels mounted to the underside of the carrier frame along a single axis, row units linked to the carrier frame on a side of the support wheels opposite the transport direction and a separate coulter/fertilizer unit corresponding to each of the row units pivotally linked to the underside of the carrier frame on a side of the support wheels opposite the row units for movement between a functional position where the coulter/fertilizer units engage the ground and a transport position where the coulter/fertilizer units are above the ground and a hydraulic cylinder mounted to the carrier frame and linked to the coulter/fertilizer units for moving the coulter/fertilizer units between the functional and transport positions.

In some embodiments the row units are linked to the carrier frame for pivotal movement between transport and functional positions, the hydraulic cylinder is a first cylinder and the planter assembly further includes a second hydraulic cylinder linked between the carrier frame and the row units for moving the row units between the functional and transport positions and, wherein, the first and second cylinders are plumbed in parallel so that the coulter/fertilizer bar and row units essentially simultaneously move between the functional and transport positions.

BRIEF DESCRIPTION OF THE DRAWINGS

FIG. 13 is a detail cross-sectional view taken along lines 13—13 of FIG. 11;

FIG. 14 is a detail cross-sectional view taken along lines 14—14 of FIG. 11;

FIG. 21 is a schematic diagram similar to the diagram of FIG. 20 illustrating force applied to a coulter cylinder and an open relief valve;

DETAILED DESCRIPTION OF THE PREFERRED EMBODIMENTS

Referring now to FIGS. 1 through 4, a preferred embodiment of the present invention will be described in the context of an agricultural assembly 10 which includes a carrier frame assembly 12, a main frame assembly 69 and a planter assembly 15. As its label implies, carrier frame assembly 12 includes components configured to facilitate transport or carrying of other assembly 10 components. Similarly, as their labels imply, main frame assembly 69 includes components configured to generally support any of several different implement assemblies while planter assembly 15, includes components used to plant seeds. Main frame assembly 69 is mounted to carrier frame assembly 12 and planter assembly 15 is mounted to main frame assembly 69.

Figure 3:
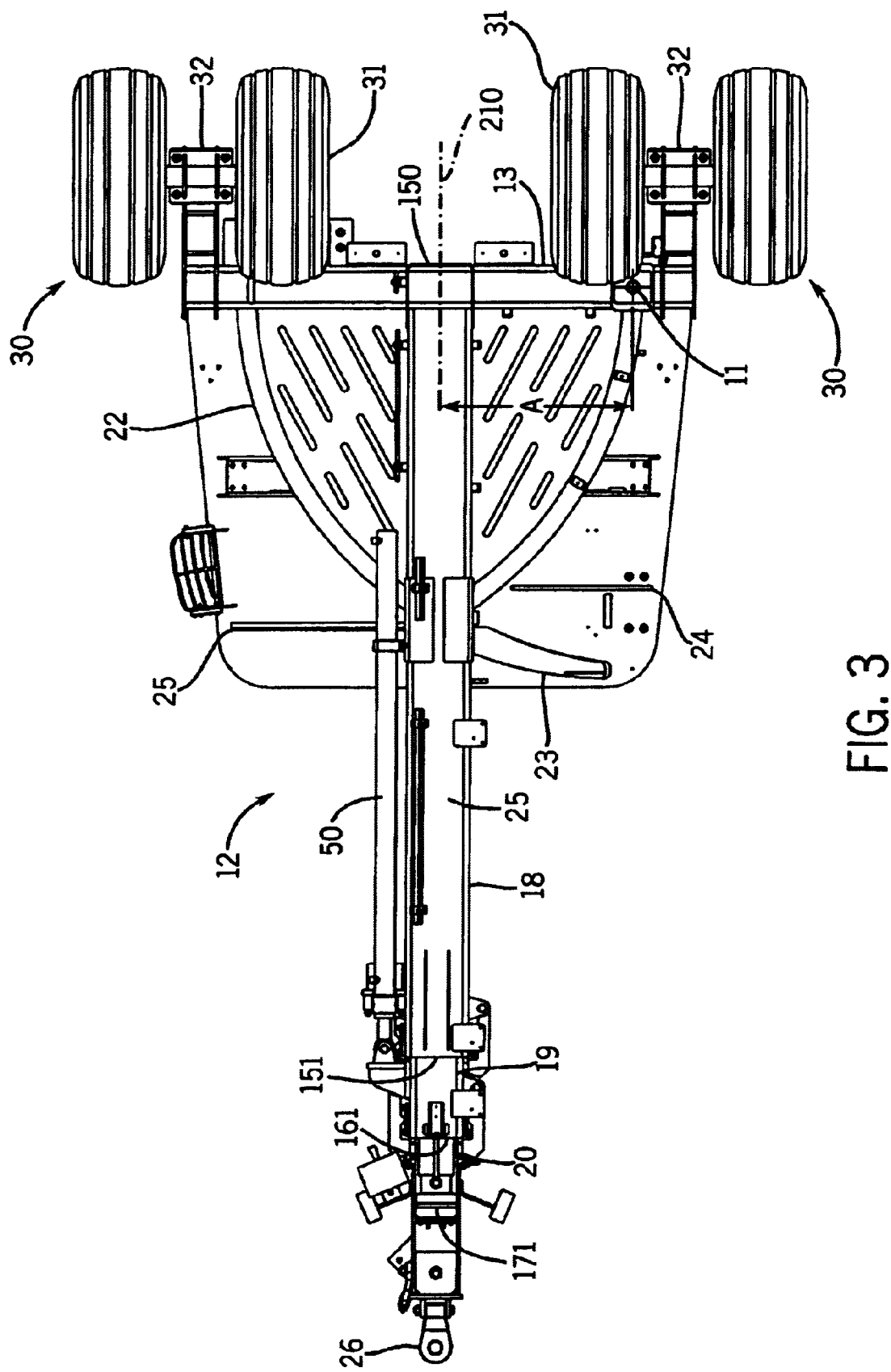
FIG. 3 is a bottom plan view of the carrier frame illustrated in FIG. 1.
Figure 4:
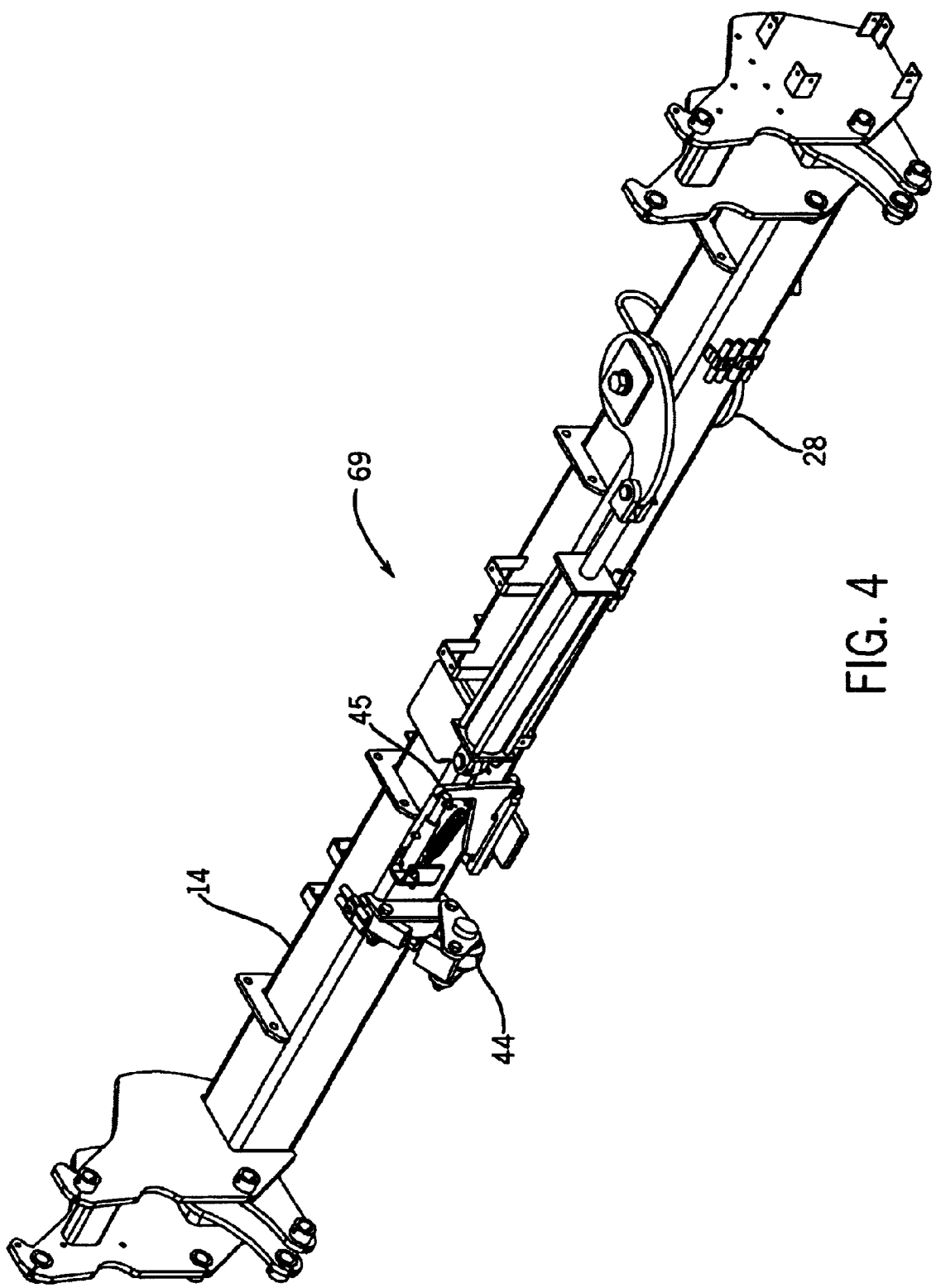
FIG. 4 is a perspective view of a mainframe assembly used with the configuration of FIG. 1.
Figure 5:
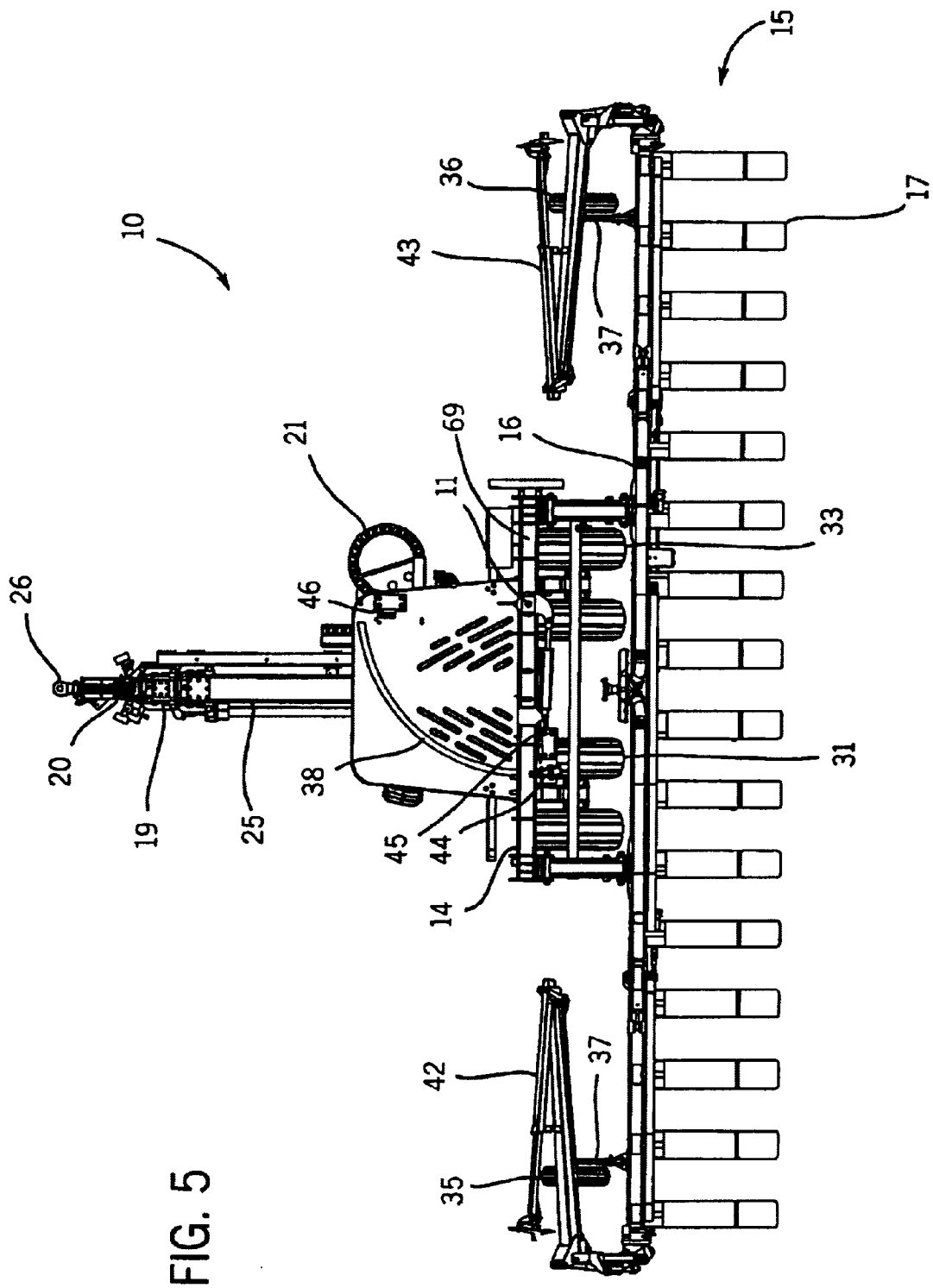
FIG. 5 is a top plan view of the embodiment of FIG. 1 in an extended operating position.

Referring still to FIGS. 1 through 4 and also to FIG. 5 (and generally to other Figures in the specification), the exemplary planter assembly 15 includes an implement bar 16, row units 17, support wheels 35, 36, wheel support members 37 and extendable markers 42, 43. Implement bar 16 is typically a rigid steel rectilinear bar having dimensions within the six by six to ten by ten range and extends along the length of implement assembly 15. Bar 16 is generally mounted to main frame assembly 69 in a manner described below.

Figure 1:
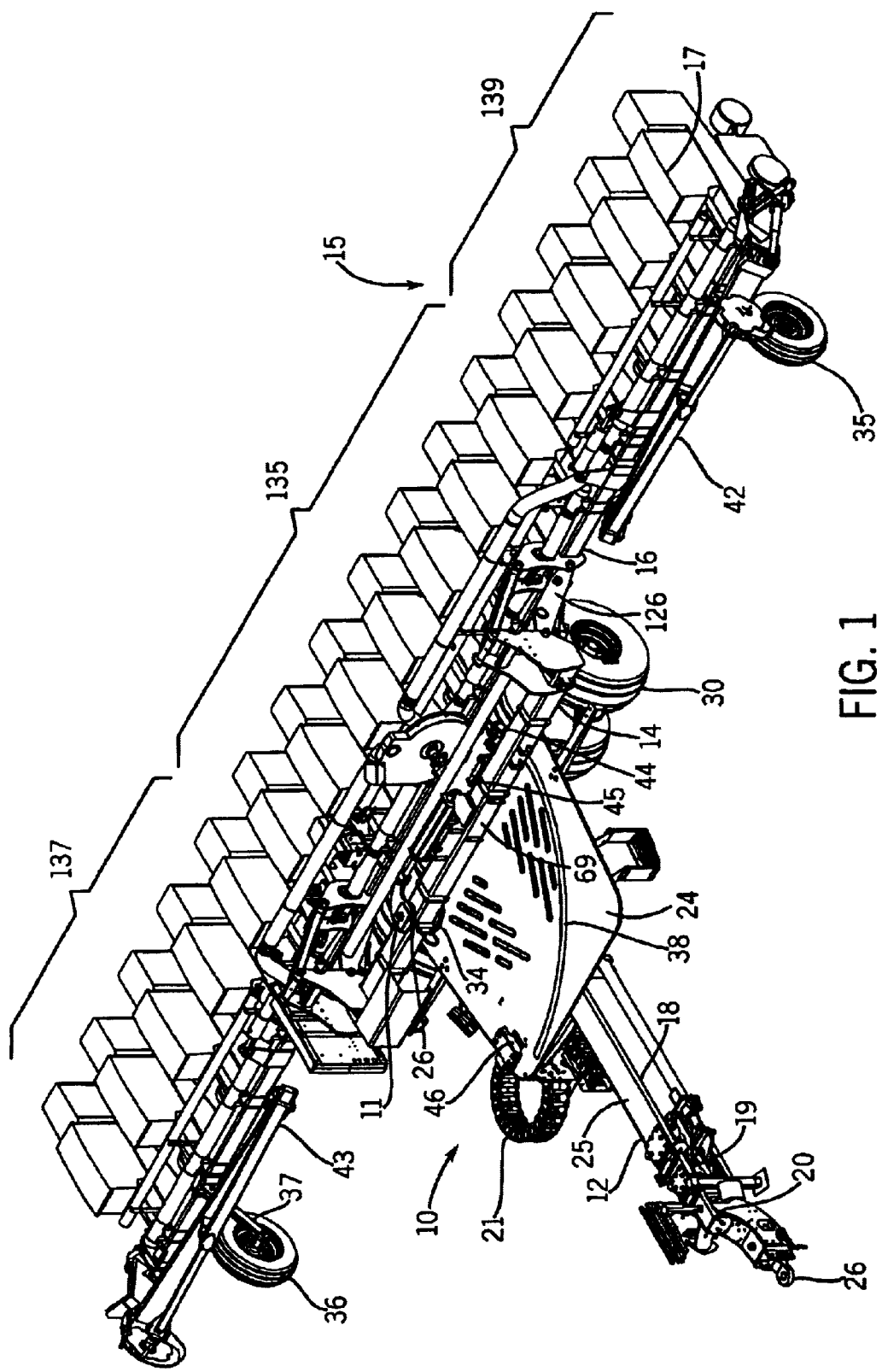
FIG. 1 is a is perspective view of a preferred embodiment of a planter apparatus constructed in accordance with one embodiment of the present invention.
Figure 8:
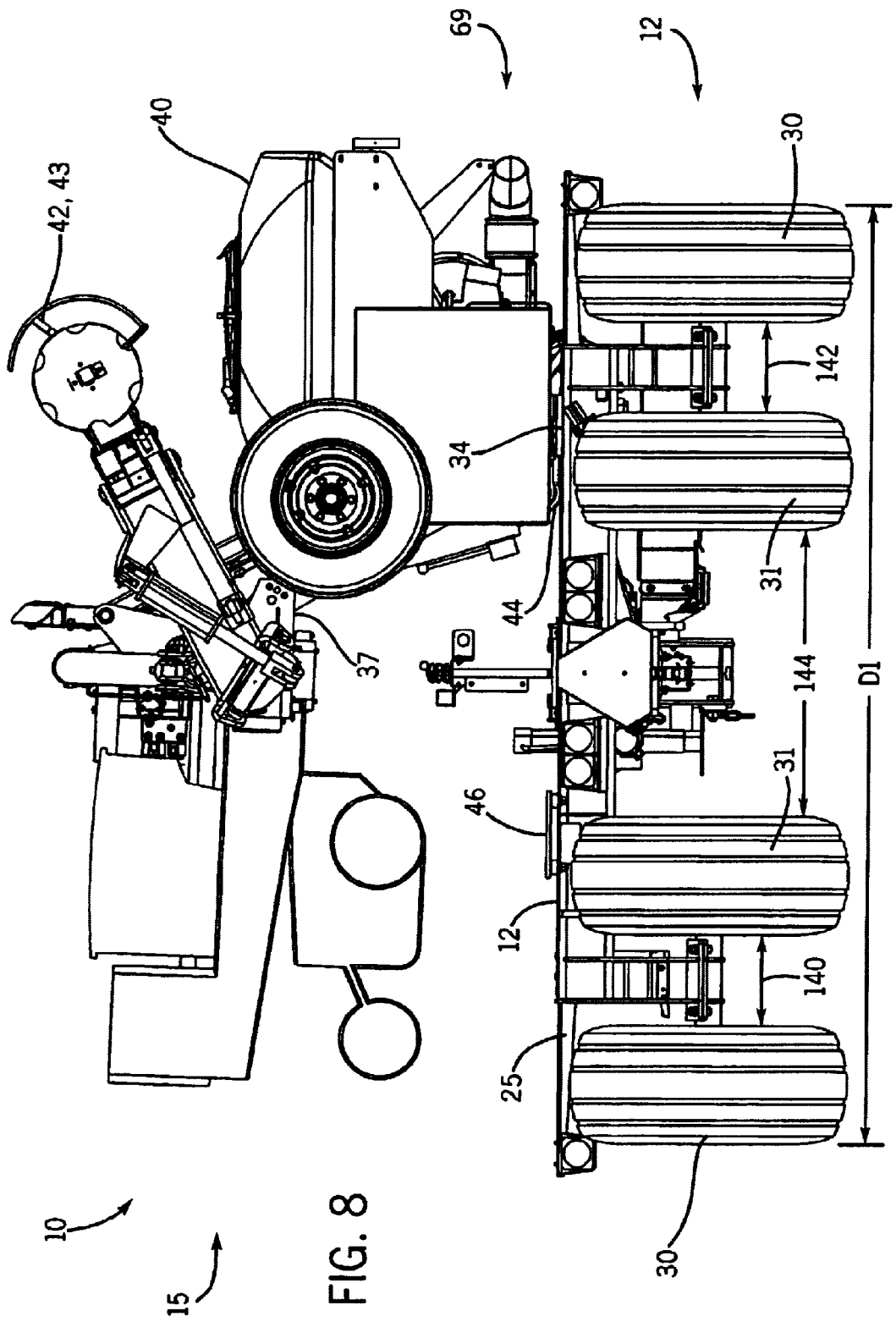
FIG. 8 is a rear perspective view of the embodiment illustrated in FIG. 1 with storage units attached and in the transport position.

Exemplary assembly 10 includes sixteen row units 17 equi-spaced along the length of bar 16. As well known in the art, each unit 17 includes a seed bin, some type of soil agitator (e.g., a coulter or spade of some type) and a seed dispenser. Although not illustrated, each bin opens above a corresponding seed dispenser and a separate agitator is provided that, as assembly 10 is pulled through a field, is directly in front of the seed dispenser. As assembly 10 is pulled through a field, the agitators each form a trench into which a corresponding dispenser dispenses seeds. Referring to FIG. 8, support wheels 31 are separated and form spaces 140, 142, 144, etc., that, as assembly 10 is pulled through a field, travel along paths that are between crop rows being formed. Referring also to FIG. 1, row units 17 are positioned on bar 16 such that units directly behind a dimension D1 formed by the wheels 31 form rows between the wheels. For instance, one row unit 17 may be mounted to bar 16 so that a resulting row is formed within the space defined by the paths formed by the left two wheels as illustrated, another row unit 17 may be mounted to bar 16 so that a resulting row is formed within the space defined by the paths formed by the right two wheels as illustrated and perhaps two row units may be mounted to form two rows in the space between paths defined by the center wheels.

Wheels 35 and 36 are mounted via wheel support members 37 at opposite ends of bar 16 and are generally positionable in two positions with respect to the ground (not illustrated). First, as illustrated in the figures, wheels 35 and 36 and/or the entire implement assembly 15 may be manipulated via hydraulic cylinders or the like such that wheels 35 and 36 are in an upright position where the wheels 35 and 36 clear the ground below. Second, wheels 35 and 36 or the entire implement assembly 15 may be manipulated such that wheels 35 and 36 contact the ground below and support the ends of the implement assembly there above with implement components either above the ground or, depending on implement type, perhaps partially engaging the ground.

Markers 42 and 43, like wheels 35 and 36, are mounted at opposite ends of bar 16 and generally extend from bar 16 to a front side (see FIGS. 1, 5, etc) of the implement assembly. Operation of markers 42 and 43 is well known in the art and therefore will not be explained here in detail. Suffice it to say markers 42 and 43 may assume either a stored position (see FIG. 5) where the markers are generally retracted or an extended and operating position (not illustrated) where the markers 42 and 43 are unfolded and extend at least in part in the direction away from units 17 and toward a tractor (not illustrated) that may be attached to assembly 10.

Figure 6:
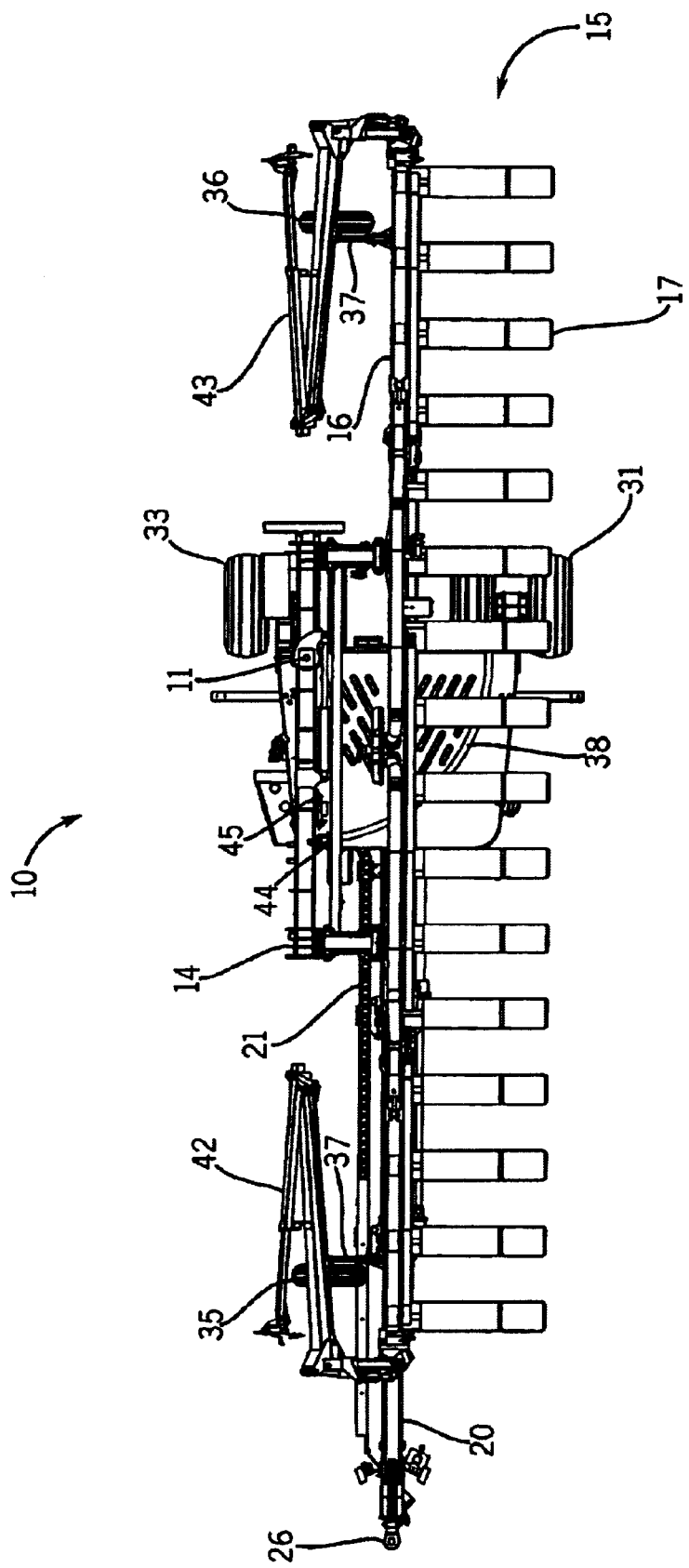
FIG. 6 is a top plan view of the embodiment of FIG. 1 in a transport position.

Referring now to FIG. 4, the main frame assembly 69 includes, among other components, a main frame bar member 14, a roller assembly 14, a latching assembly 45 and a pivot plate 28. Pivot plate 28 is mounted to an undersurface of bar member 14 about one-fourth the length of bar member 14 from a first end thereof and forms a downwardly opening pivot receiving aperture (not observable in the FIGS.) for receiving a carrier frame assembly pivot pin (see 34 in FIG. 2) which is described in more detail below. Latch assembly 45 cooperates with other system latching components (e.g., see two instances of latch 46 in FIG. 2) mounted on the carrier frame assembly 12 to lock the main frame assembly 69 and attached implement assembly 15 in either a transport position (see FIGS. 6, 8 and 9) or an operating position (see FIGS. 1 and 5). Precise configuration and operation of assembly 45 is not explained here in the interest of simplifying this explanation.

Roller assembly 44 is mounted to bar member 14 at a point about one-fourth the length of bar 14 from a second bar 14 end (not numbered) and includes at least one roller mounted for rotation in a direction substantially perpendicular to the length of bar member 14 and that is formed so as to be supportable on a track runner (e.g., 38 in FIG. 2) formed by a carrier frame platform (see platform 24 in FIGS. 2 and 3) that is explained in greater detail below. Thus, plate 28 and assembly 14 are, in the present example, essentially equi-spaced along the length of bar 14. Positioning of plate 28 and wheel assembly 44 is important to ensure proper balancing of the attached implement assembly 15 and is generally a function of how best to balance assembly 15 about a carrier assembly axis 210 (see FIG. 2).

Figure 9:
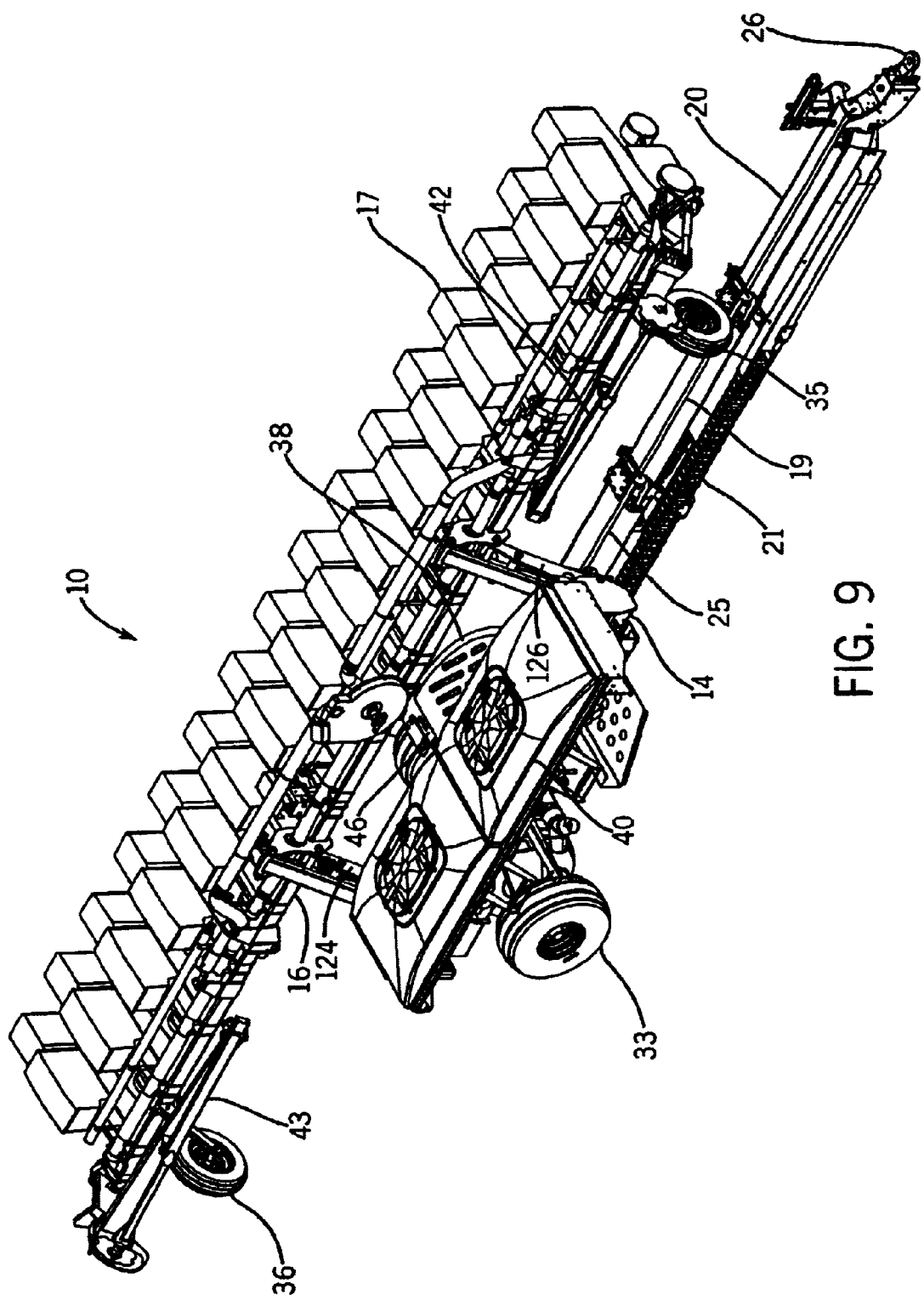
FIG. 9 is a perspective view of the embodiment of FIG. 8 with storage units in the transport position.
Figure 19:
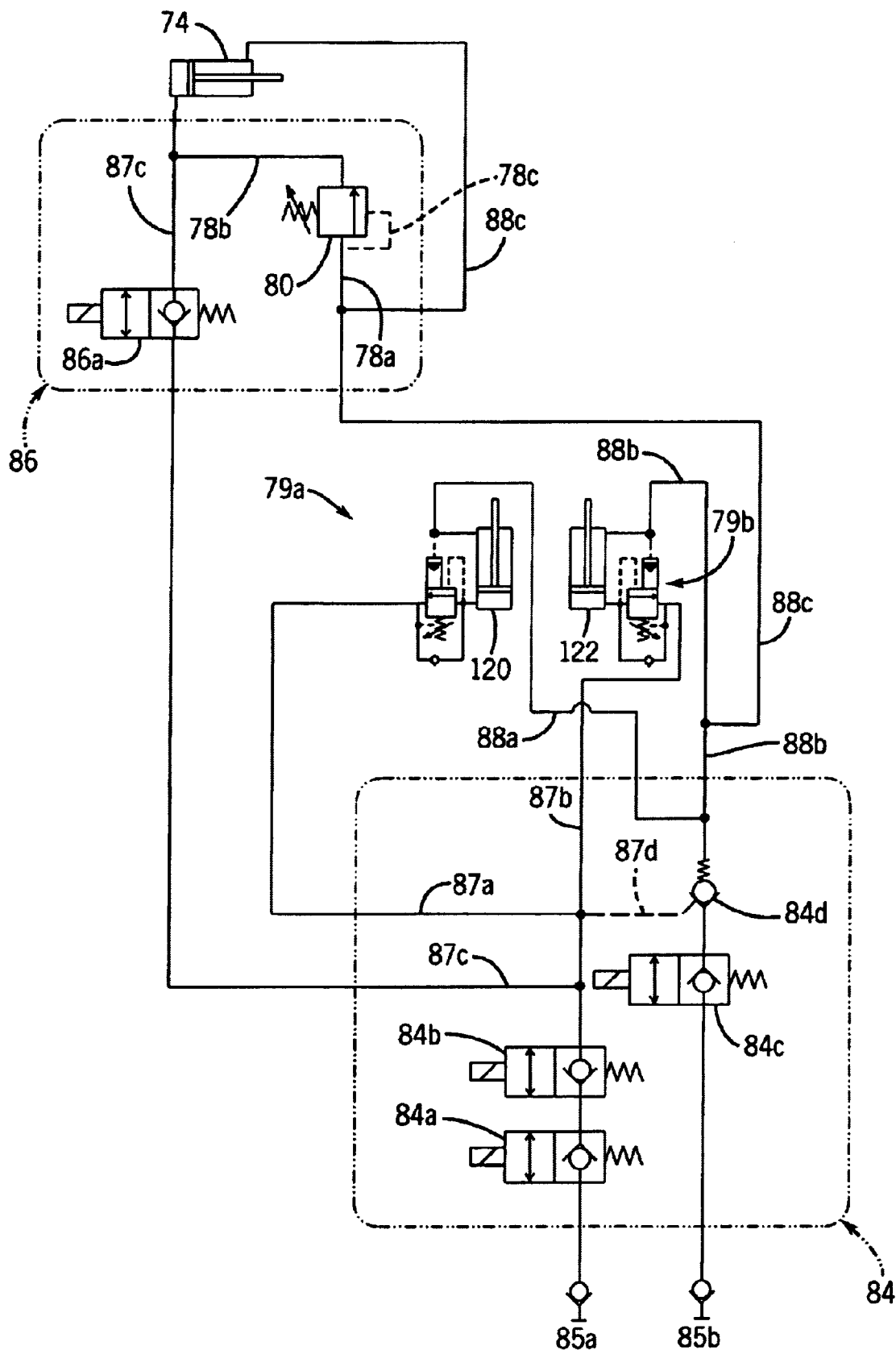
FIG. 19 is a schematic diagram of the system hydraulics in an inoperative mode.

Referring to FIGS. 1 and 9 and also FIG. 19, assembly 10 further includes first and second lift cylinders 120 and 122 and corresponding first and second pivoting brackets 124 and 126, respectively. Brackets 124 and 126 are constructed so that opposite ends of each bracket are pivotally securable to the main frame bar member 14 and the implement bar 16. The first and second lift cylinders 120 and 122 each includes a rod end and a base end and opposite ends are linked to the mainframe bar member 14 and the implement bar 16 such that, when the cylinders are retracted, the implement bar 16 and linked components are lowered into a functional and ground engaging position illustrated in FIG. 1 and, when the cylinders 120 and 122 are extended, implement bar 16 is raised into a transport and ground clearance position illustrated in FIGS. 8 and 9.

Figure 10:
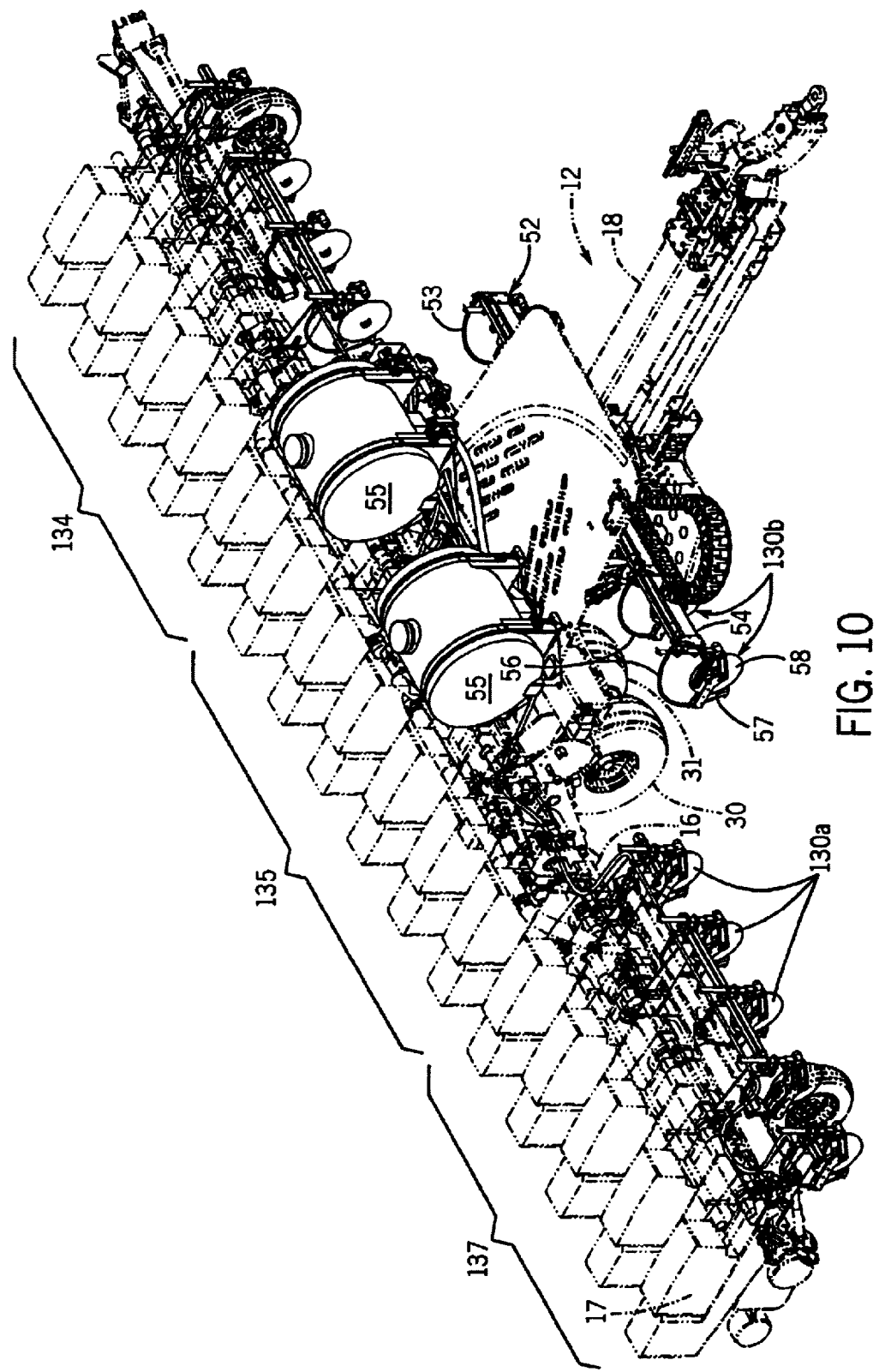
FIG. 10 is a perspective view of a coulter assembly attached to the agricultural apparatus.

Referring to FIGS. 8 and 9, in addition to the components described above, storage pods 40 are shown secured to the main frame bar 14. Similarly, fertilizer pods 55 are illustrated in FIG. 10.

Referring still to FIGS. 1, 2, 3 and 5, carrier frame assembly 12 generally includes a cross bar 13, two wheel assemblies 30, a draw bar assembly 18 and platform 24. Each wheel assembly 30 includes an axle support member 32 and a pair of support wheels 31 mounted on opposite sides of a corresponding support member 32. As best seen in FIG. 8, the support wheels define support dimension D1. Dimension D1 is wide enough that the entire planter assembly 10 is laterally stable but should be limited to a size that is accommodated by a typical roadway. For instance, dimension D1 may be between 10 and 15 feet.

Cross bar 13 is a steel elongated bar. A separate one of wheel assemblies 30 is mounted at each one of the cross bar 13 ends and extends downward there from so that assemblies 30 support cross bar 13 above ground. A pivot pin 34 is provided that extends upwardly from a top surface of bar 13. Pin 34 is formed about a vertical axis 11 and is formed so as to be receivable by the downwardly facing opening formed by pivot plate 28 (see FIG. 4) for rotation thereabout.

Figure 2:
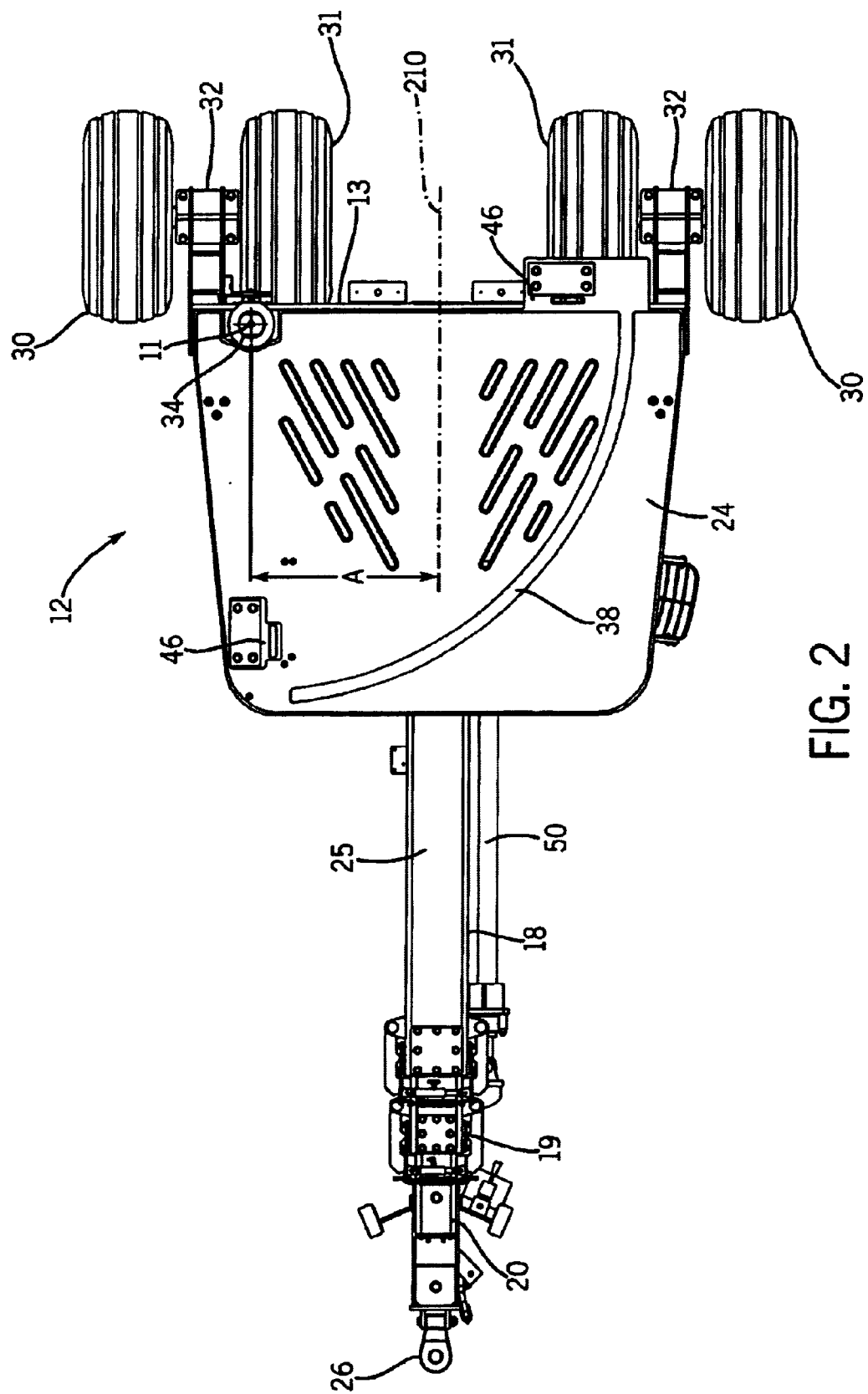
FIG. 2 is a top plan view of the carrier frame of illustrated in FIG. 1.

Referring to FIGS. 2 and 3, draw bar assembly 18 is a two stage tongue assembly. Assembly 18 is described in great detail in the Planter Hitch Apparatus patent application referenced above and which has been incorporated herein by reference and therefore apparatus 18 will not again be described here in detail. Suffice it to say at this time that, among other components, assembly 18 includes a first tongue member 25 having first and second ends 150 and 151 and forming a first passageway (not illustrated). As best seen in FIG. 3, first tongue member 25 is secured at its first end 150 to a central point of cross bar 13 via welding or some other suitable securing process. In addition, assembly 18 further includes second and third tongue members 19 and 20, respectively, and includes two tongue cylinders (only one shown at 50, the second tongue cylinder internally disposed within the tongue assembly). Second member 19 is receivable within first tongue member 25 and first tongue member 20 is receivable within second tongue member in a telescoping manner such that, when retracted, distal ends 171, 161 and 151 of members 20, 19 and 25, respectively, are adjacent each other. Members 19 and 25 are driven by cylinder 50 and the internally mounted cylinder between the retracted and operating configuration illustrated in FIG. 3 and the extended and transport configuration illustrated in FIG. 9. A hitch member 26 is mounted to the distal end 171 of tongue member 20 for linking assembly 10 to a prime mover like a tractor.

Figure 11:
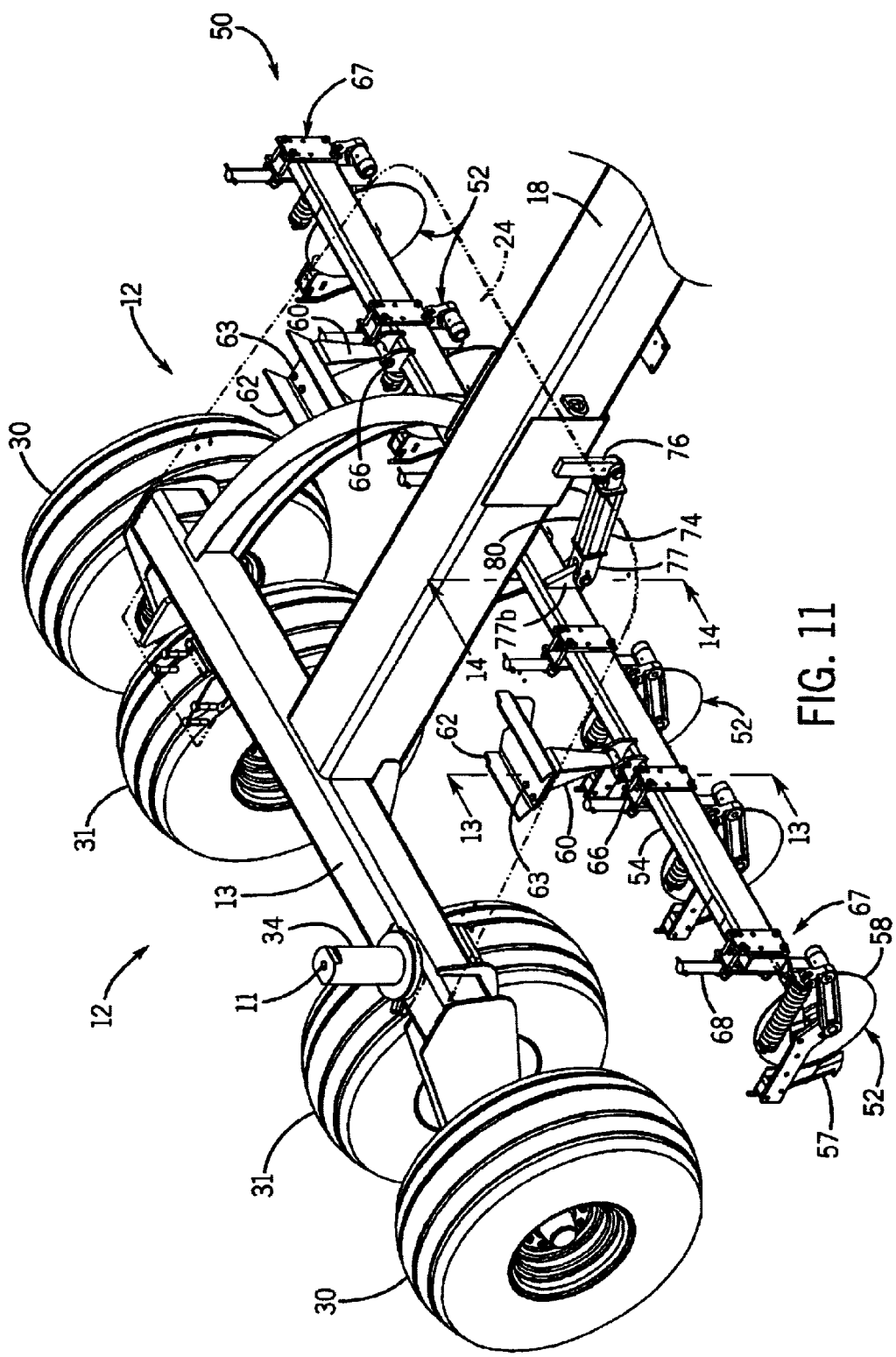
FIG. 11 is a detail perspective view of the coulter assembly and the carrier frame.
Figure 12:
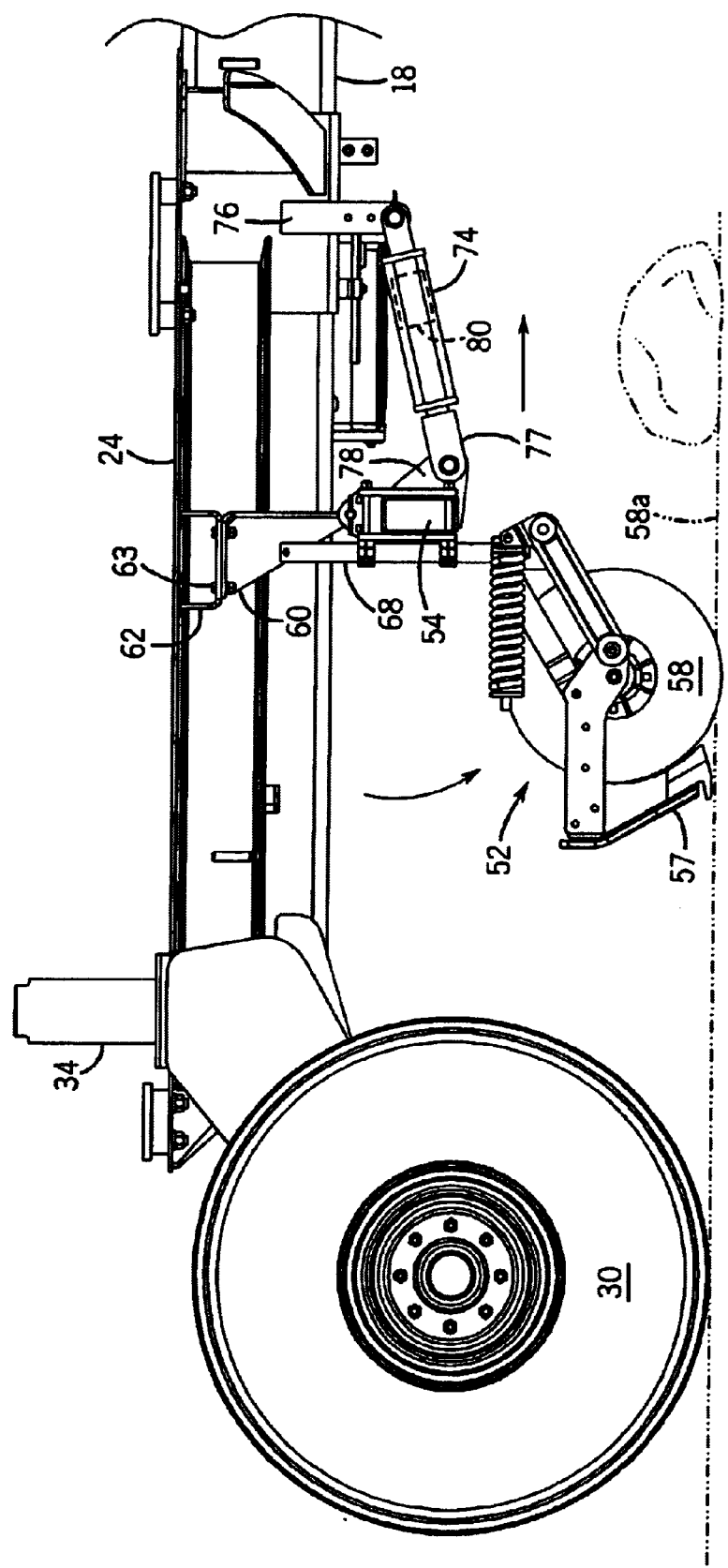
FIG. 12 is a side elevation view of the coulter assembly in the functional or ground engaging planting position.

Referring to FIGS. 2, 3, 8, platform 24 is essentially a rigid flat bed member that is secured to a top surface of cross bar 13 and approximately half of first tongue member 25 proximate cross bar 13. Referring also to FIGS. 11 and 12, additional support bars 62 may also be provided to support platform 24. Among other features, platform 24 forms a track runner 38 on a top surface which is reinforced on a platform undersurface (see FIG. 3) via supporting tracks 23 and 22 or in any other manner known in the art. Pivot pin 34 extends through an opening in platform 24. Referring also to FIG. 4, track runner 38 forms an arc about pivot pin 34 having a radius dimension that is identical to the space dimension between pivot plate 28 and roller assembly 44 on bar 14. Runner 38 is dimensioned so as to securely support the roller of assembly 44 in any position along the runner and thereby provide support to main frame bar 14 there above.

Referring still to FIGS. 2 and 4, transport and operating implement locking brackets or latches 46 are also provided on the top surface of platform 24. A transport bracket 46 is generally spaced from pivot pin 34 along a line parallel to the length of first tongue member 25 while an operating bracket 46 is generally spaced from pin 34 on the side of first tongue member 25 opposite pin 34. Each bracket 34 is formed so as to securely receive and lock to latch assembly 45 to lock the main frame assembly 69 and other components secured thereto to platform 24 in either the transport or operating positions.

Referring now to FIGS. 1, 2, 4 and 8, with carrier frame assembly 12 assembled and implement assembly 15 secured to the main frame assembly 69 as described above, the main frame bar 14 is positioned such that pin 34 is received in the opening formed by plate 28 and with the assembly 44 roller supported on runner 38. Gravity maintains main frame assembly 69 on runner 38 and some type of collar (not illustrated) on pin 34 may be provided to further ensure that assembly 69 remain secured. With wheels 35 and 36 and/or the implement assembly manipulated so that the wheels 35,36 are off the ground, the entire main frame bar 14 and components attached thereto are moveable between the transport position illustrated in FIG. 9 to the operating position illustrated in FIG. 1 and to any intermediate position there between (see FIG. 7) by simply rotating main frame bar 14 about pivot pin 34.

As indicated above, when in either the transport or operating positions, latch assembly 45 and one of brackets 46 cooperate to lock main frame bar 14 to carrier assembly 12 to eliminate relative movement during transport. Any means for rotating bar 14 about pin 34 may be employed. Similarly, any means for operating latch assembly 45 and for raising and lowering the implement assembly and/or the lateral support wheels 35, 36 may be employed.

Figure 7:
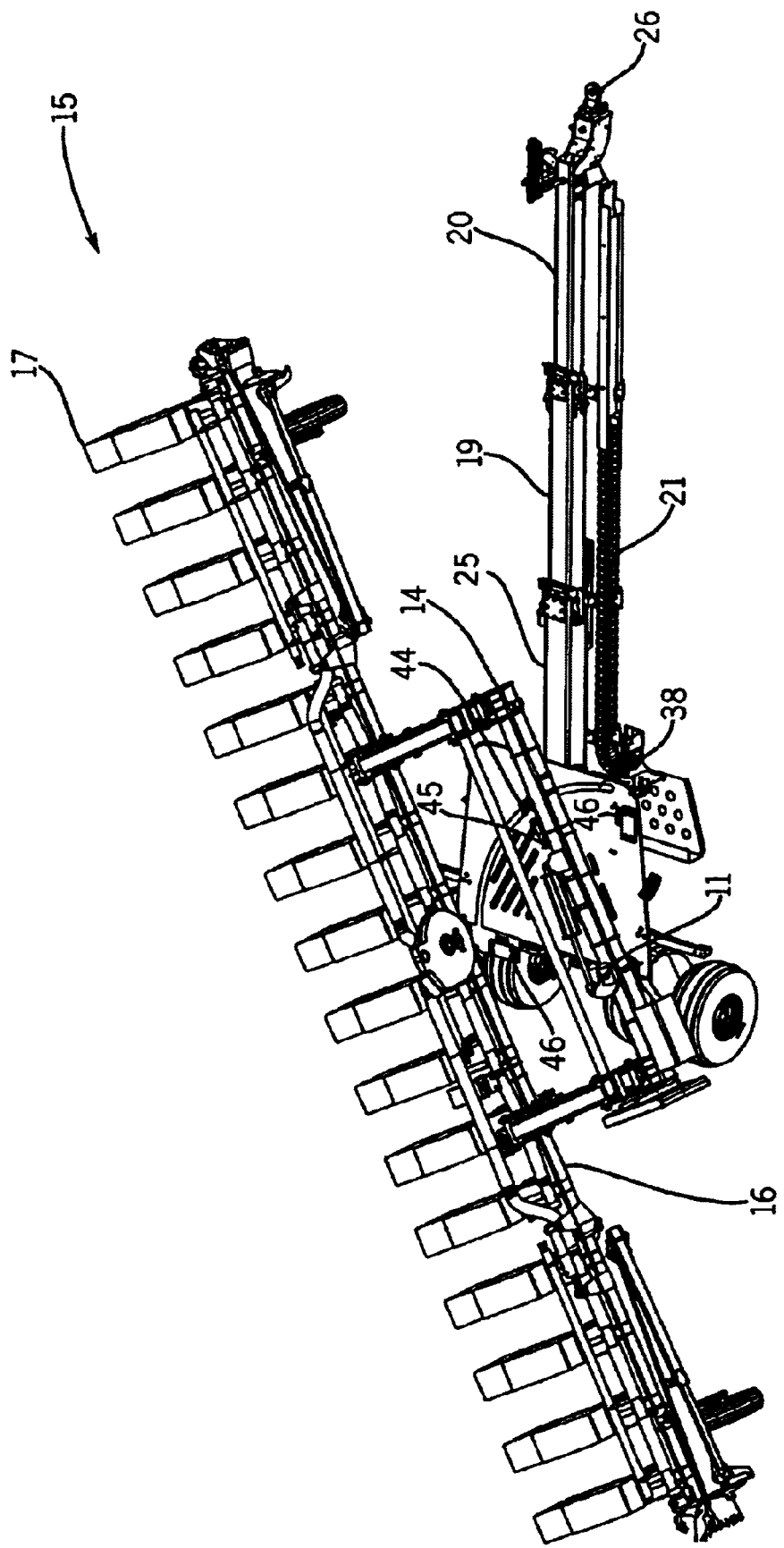
FIG. 7 is a perspective view of the embodiment of FIG. 1 in an intermediate position with an implement between the operating and the transport positions.

Referring again to FIG. 1 where the assembly is shown in the operating position, consistent with reducing the number of required headland passes needed to perform an agricultural task for an entire field, the cross bar assembly 18 is relatively short. Referring also to FIGS. 7 and 9, however, it can be seen that, in order to accommodate a long implement configuration in the transport position, the tongue assembly has to be extended.

Referring again to FIG. 1 and also to FIG. 10, some definitions will be helpful in understanding the remainder of this specification. To this end, while implement bar 16 is a single component, bar 16 includes portions that will be referred to hereinafter as different segments. The segments include a central segment 135 that, when bar 16 is in the operating position (see FIG. 1), is behind and adjacent the support dimension D1 (see FIG. 8). In addition, bar 16 includes lateral segments 137 and 139 that extend laterally to either side of central segment 135. The row units mounted to central segment 135 will be referred to hereinafter as central row units and the row units mounted to the lateral segments 137 and 139 will be referred to hereinafter as lateral row units. Thus, as illustrated in FIG. 1, there are six central row units 17 and five lateral row units to either side of the central row units.

Referring now to FIG. 10, in addition to the components described above, the illustrated embodiment further includes a plurality of coulter/fertilizer units 130a and 130b, a separate unit 130 for each of the row units 17. Like the row units 17, the coulter/fertilizer units include lateral and central units including six central coulter/fertilizer units 130b (only two illustrated in FIG. 10) and five lateral units 130a to either side of the central units 130b. As illustrated, lateral units 130a are rigidly mounted to the front sides (i.e. on a side of the row units facing the transport direction) of each of their respective row units 17 in some fashion. Thus, when implement bar 16 is raised and lowered, the lateral coulter/fertilizer units 130a raise and lower therewith.

Referring to FIGS. 10 through 12, as well known in the agricultural arts, each coulter unit includes a coulter or knife member 58 of some type and a fertilizer nozzle 57 that opens directly behind the corresponding coulter 58. Fertilizer tanks 55 are linked to nozzles 57 via tubes 56 for supplying fertilizer thereto.

Referring still to FIG. 10 it should be appreciated that, as illustrated, the wheel assemblies 30 (see also FIG. 8) below the carrier frame make it essentially impossible to mount coulter/fertilizer units to the front ends of the central row units (i.e., the row units 17 mounted to central bar segment 135). Despite not being able to mount coulter/fertilizer units to the front ends of the central row units, the coulter/fertilizer functions have to be performed for each of the central row units.

According to the present invention, the coulter/fertilizer functions for the central row units are facilitated by providing a coulter/fertilizer assembly/apparatus 50 on the transport direction side of the support wheels. Referring still to FIG. 10 and also to FIGS. 11, 12, 13 and 16 through 18, coulter assembly 50 includes, among other things, mounting brackets 60, at least one coulter cylinder 74, a coulter bar 54 and a plurality of coulter/fertilizer units 58. Bar 54 is pivotally mounted to the underside of carrier frame 12 or, more specifically, to a support bar 62 on the underside of frame 12. To this end, two downwardly extending hanger brackets 60 are mounted to the under side of bar 62 via bolts 63 or some other securing mechanism (e.g., welding). At a lower distal end, each bracket 60 forms an opening (not separately numbered) and, when installed properly, the two openings are concentric.

Two pivot brackets 64 are welded to a top side of coulter bar 54, each bracket 64 supporting a pin member 66 (see FIG. 13) sized to be received within one of the bracket 60 openings. Bar 54 is mounted to the brackets 60 via the pivot bracket pins 66 that are received within the bracket openings so that bar 54 is moveable between a functional position shown in FIG. 12 and a transport position shown in FIG. 17.

Coulter/fertilizer units 52 are equi-spaced and secured to coulter bar 54 with mounting assemblies, each mounting assembly including a clamping brackets 67 and an adjustment bars 68. Clamping bracket 67 includes plates 70 and 71 and clamping bolts 72. Plates 70 and 71 are juxtaposed on opposite sides of coulter bar 54 with bolts 72 clamping the plates together against oppositely facing surfaces of bar 54. Mounting members 69 are bolted to the outwardly facing surface of plate 70 and are formed to receive and lock adjustment bar 68.

As in the case of the lateral coulter/fertilizer units 130a mounted to the lateral row units 17, each central coulter/fertilizer unit 130b includes a coulter or knife member 58 of some type for forming a trench and a fertilizer nozzle 57 that follows the coulter member 58. Each nozzle is linked to one of the fertilizer tanks 55 via a supply tube 56 (see again FIG. 10). Units 52 are mounted to the lower ends of bars 68.

Referring to FIGS. 10, 11, 12 and 14, a downwardly extending lug 76 is mounted to the underside of draw bar 18 on a side of coulter bar 54 that faces the transport direction (i.e., on a side of bar 54 opposite the support wheels 30, 31). Another lug 77b is mounted to bar 54 which, when bar 54 is in the functional position (see FIG. 12), faces in the transport direction. Hydraulic cylinder 74 is pivotally anchored to lug 76 at one end and is pivotally attached to coulter bar 54 via a clevis 77 and pin 77a pivotally secured to lug 77b at the other end. Hereinafter it will be assumed that the base and rod ends of cylinder 74 are linked to the draw bar 18 and coulter bar 54, respectively, unless indicated otherwise.

Referring to FIGS. 11 and 12, in the lowered, or functional position, cylinder 74 is generally pressurized in the retracted state, providing a rigid link between coulter bar 54 and carrier frame 12. When in the functional position, cylinder 74 resists draft loads acting between coulter/fertilizer units 58 and soil 58a.

Figure 16:
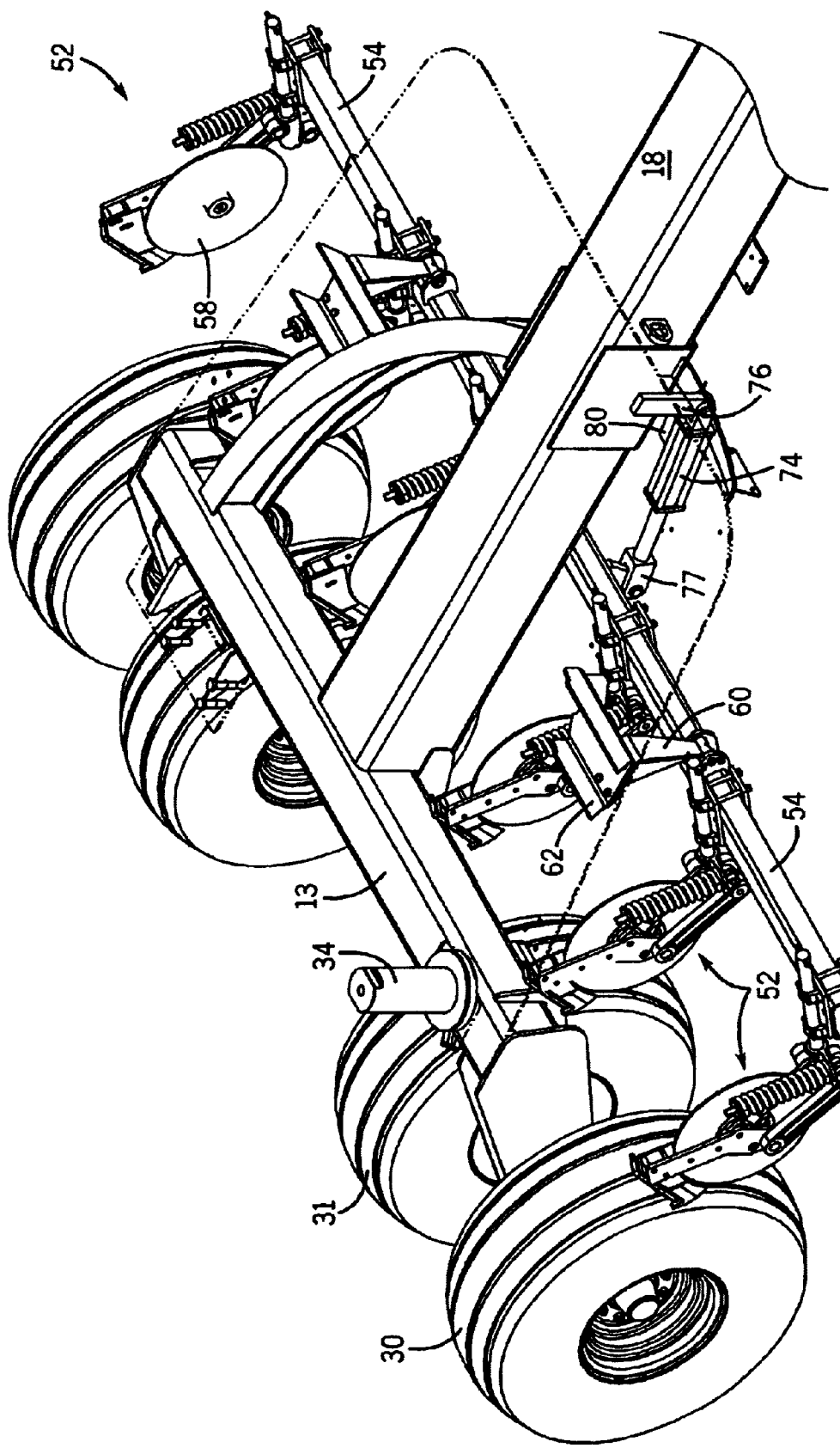
FIG. 16 is a detail perspective view like FIG. 11, showing the coulter assembly in the ground clearance or transport position.
Figure 17:
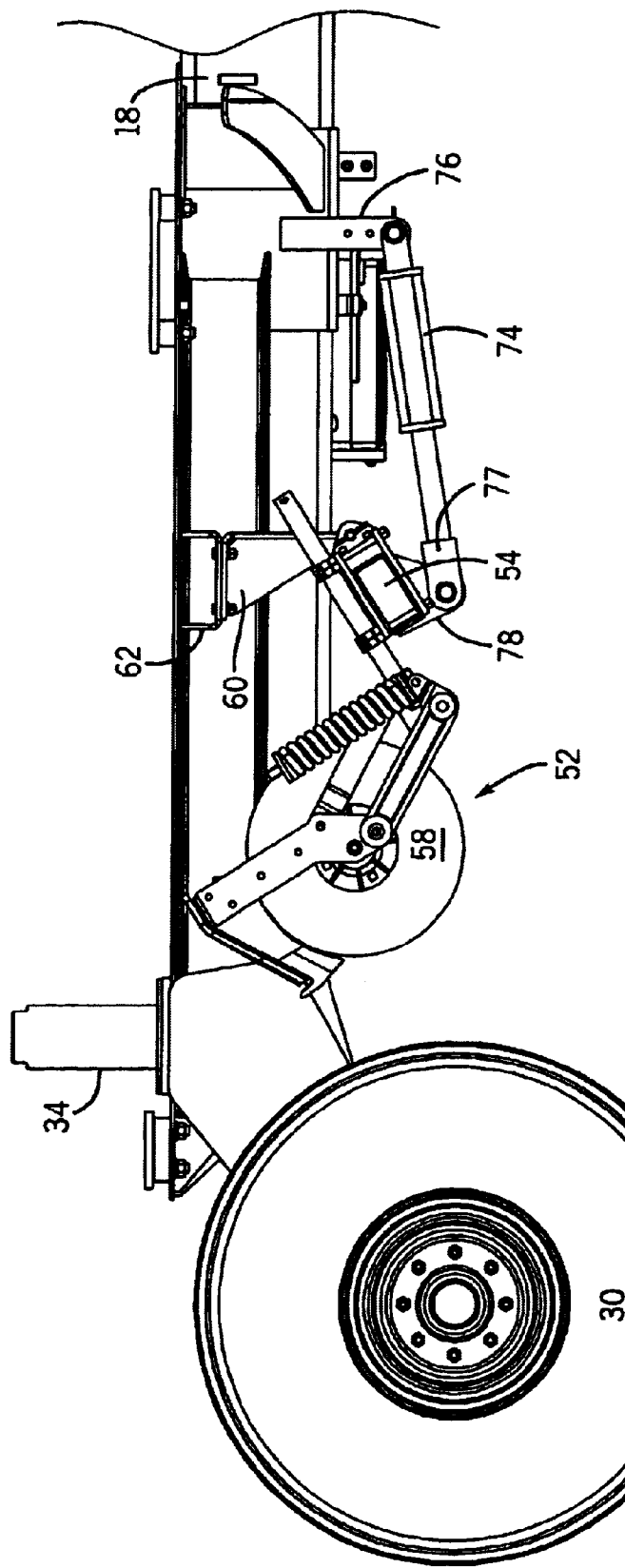
FIG. 17 is a side elevation view of the coulter assembly in the ground clearance or transport position.

FIGS. 16 and 17 show coulter apparatus 50 in the inoperative, end-of-field (i.e., when the operator must turn the assembly around at the end of a field) or transport position where cylinder 74 is pressurized in an extended state so that coulter bar 54 pivots about pins 66 and cylinder 74 raises coulter/fertilizer assembly 50 to a ground clearing height (i.e., where the coulter/fertilizer units 52 clear the soil 58a there below).

Figure 15:
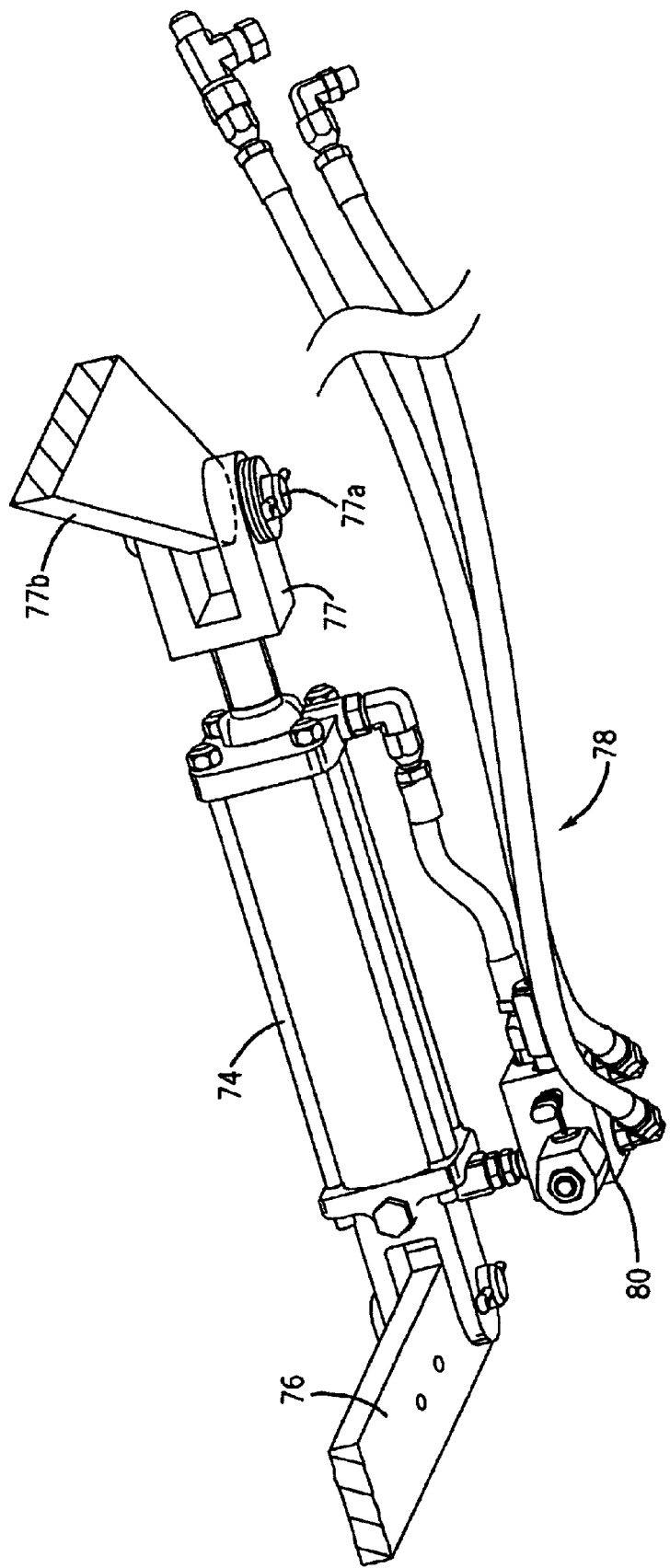
FIG. 15 is a detail perspective view of the coulter assembly's hydraulic cylinder and relief valve.

In addition to the components above, several embodiments of the invention include some type of overload protection mechanism that, when excessive force is applied to the coulter/fertilizer units 52, reduces the pressure on units 52 thereby allowing those units to fold toward the transport position (see FIG. 17) to reduce the risk of damaging the units 52. To this end, referring to FIGS. 15 and 19, a first embodiment of the overload protection mechanism includes an overload relief valve 80 that is plumbed to the coulter cylinder 74. Relief valve 80, as its label implies, releases cylinder pressure to relieve the units 52 when cylinder pressure (also referred to herein as a secondary force) exceeds a threshold pressure level calculated to be below a pressure that is likely to cause damage to the units 52.

Figure 18:
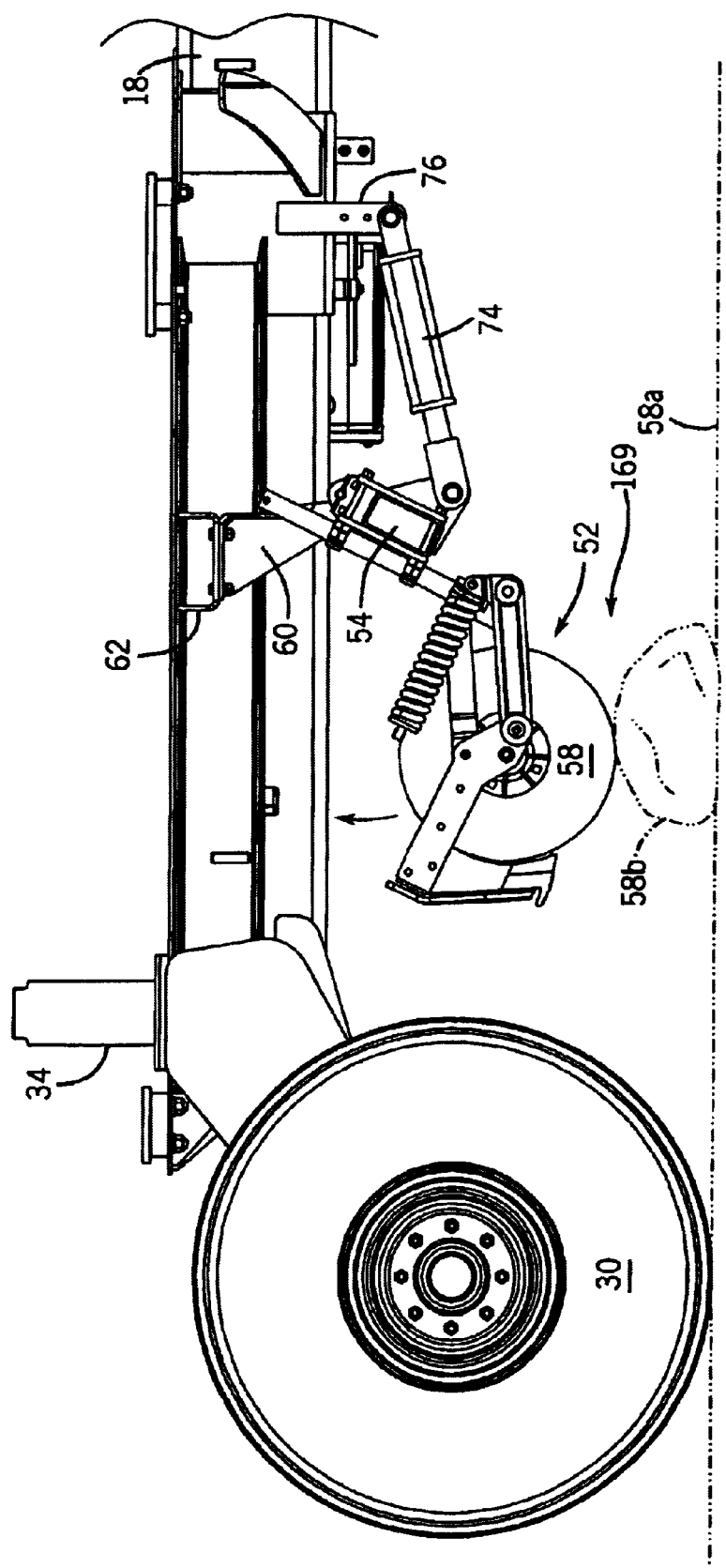
FIG. 18 is a side elevation view of the coulter assembly showing the overload function in operation.

Referring now to FIG. 18 coulter/fertilizer unit 52 is shown having encountered an obstacle 58b of sufficient resistance to actuate (i.e., open) the relief valve 80. When valve 80 opens, pressure is relieved on the rod side of cylinder 74 thereby allowing cylinder 74 to extend under the force of the obstacle 58b. After cylinder 74 extends and coulter 58 has passed the obstacle 58b, valve 80 can again be closed and pressure reapplied to the rod side of cylinder 74 to retract the rod and thus again lower the coulter/fertilizer units and bar 54 into the functional position.

In at least some embodiments of the invention cylinder 74 is tied into the lift system that is used to lift and lower the implement bar 16 and row and coulter/fertilizer units mounted thereto. By linking the cylinders that control bars 16 and 54 together, the coulter/fertilizer units 130a and 130b can be raised and lowered in unison. To this end, referring now to FIG. 19, an exemplary hydraulic control system is illustrated. The system includes a lift valve assembly 84, a coulter valve assembly 86, the lift cylinder assemblies 79a and 79b (i.e., the cylinder assemblies including cylinders 120 and 122 used to lift and lower the implement bar 16) and the coulter cylinder 74.

Lift valve assembly 84 is comprised of solenoid valves 84a, 84b and 84c, and a pilot-operated check valve 84d. Ports 85a and 85b are connected to a tractor hydraulic system (not shown) including an auxiliary valve, a hydraulic pump, a reservoir tank, and other hydraulic equipment.

Port 85a is linked to series first and second valves 84a and 84b where each of valves 84a and 84b may be open for two directional flow or may be set as a check valve to block flow in one direction and allow flow the in the other direction. The second position of valve 84a blocks flow from port 85a while the second position of valve 84b blocks flow in the opposite direction.

The outlet of valve 84b is linked to the base sides of each of lift cylinders 120 and 122 via lines 87a and 87b. The rod sides of each of cylinders 120 and 122 is linked to a pilot-operated check valve 84d via lines 88a and 88b, respectively, which is in turn linked to port 85b via a valve 84c. Valve 84c is similar to valve 84a in that it has two positions where the first position allows bi-directional flow and the second position only allows flow from the system to port 85b. Check valve 84d generally allows flow from port 85b to the system but generally blocks flow in the opposite direction unless primed at a valve inlet. The check valve priming inlet is linked to the output of valve 84b via a line 87d so that, when fluid pressure is applied at port 85a with valves 84a and 84b open, check valve 84d allow flow from the system to valve 84c and out to the reservoir. Thus, valve 84d only allows flow from the system out port 85b when the system is controlled to extend the cylinders and blocks flow after cylinders 120 and 122 are retracted. The end of valve 84b that is linked to valve 86a and the end of valve 84c that is linked to valve 84d are sometimes referred to herein as first and second intermediate ports, respectively.

Referring still to FIG. 19, coulter valve assembly 86 includes a solenoid operated valve 86a and relief valve 80. Relief valve 80 includes an inlet port linked to a line 78a and an outlet port linked to a line 78b and a pilot line 78c that feeds a valve primer. Valve 80 is preferably adjustable so that a threshold pressure level can be modified. Valve 80 inlet line 78a is linked to the rod side of cylinder 74 and outlet line 78b is linked to the base side of cylinder 74 with line 78c linked to line 78a. Thus, when pressure in line 78a exceeds a threshold pressure level set for valve 80, the pressure in pilot line 78c causes valve 80 to open.

The outlet of valve 84b is linked to solenoid valve 86a via a line 87c and the outlet of valve 86a is linked to the base side of cylinder 74. Valve 86a includes two positions, a bi-directional position and a second position in which valve 86a blocks flow from the base end of cylinder 74 and from relief valve 80. The rod side of cylinder 74 is linked to the rod sides of cylinders 120 and 122. Thus, the series cylinder 74 and valve 86a are plumbed in parallel with cylinders 120 and 122. When valve 86a is in the second position, cylinder 74 is essentially cut out of the parallel plumbing arrangement and will not extend and retract with the lift cylinders 120 and 122. Thus, valve 86a can be used to effectively isolate cylinder 74 and the coulter/fertilizer units 52 controlled thereby.

Figure 20:
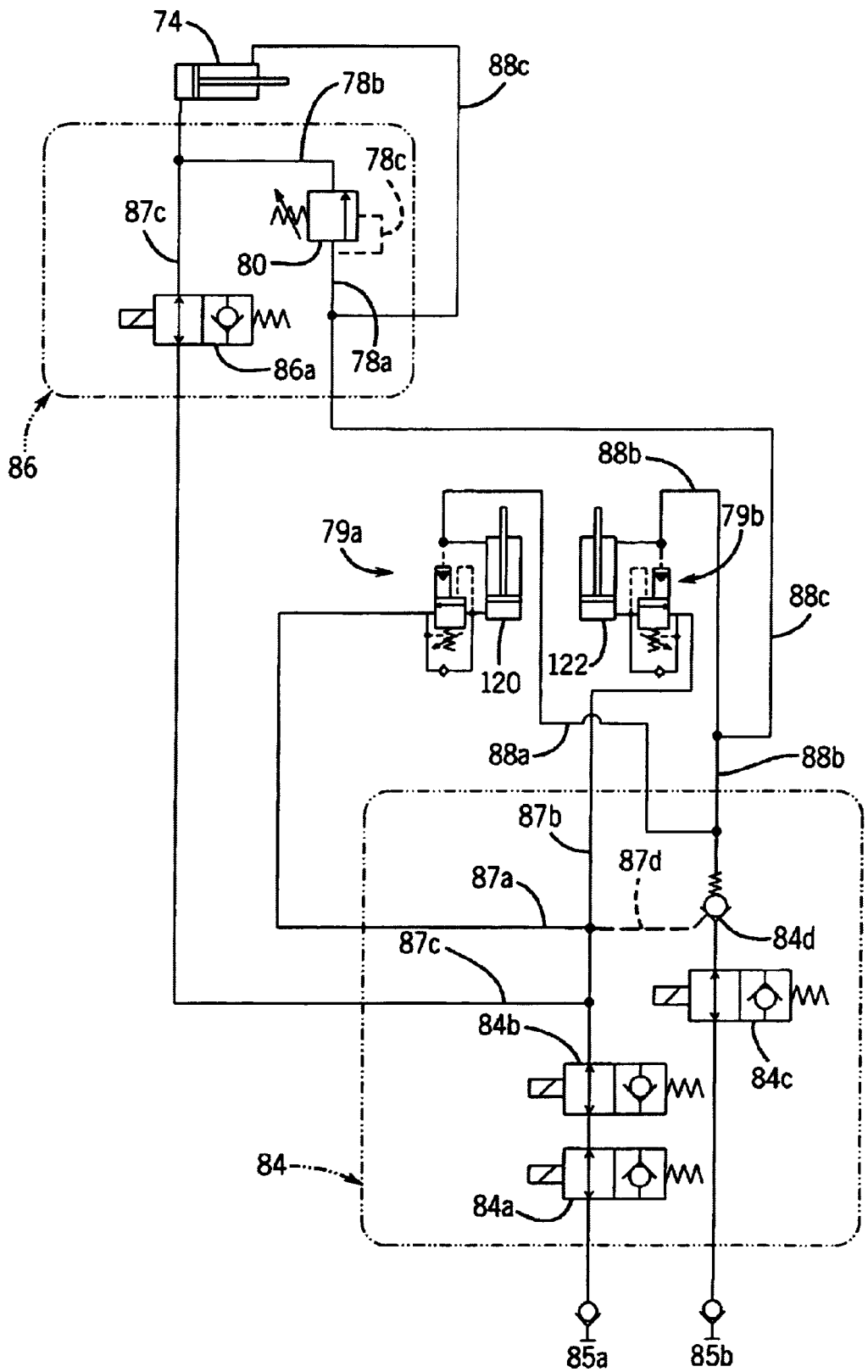
FIG. 20 is a schematic diagram of the coulter hydraulics in an operative mode.
Figure 22:
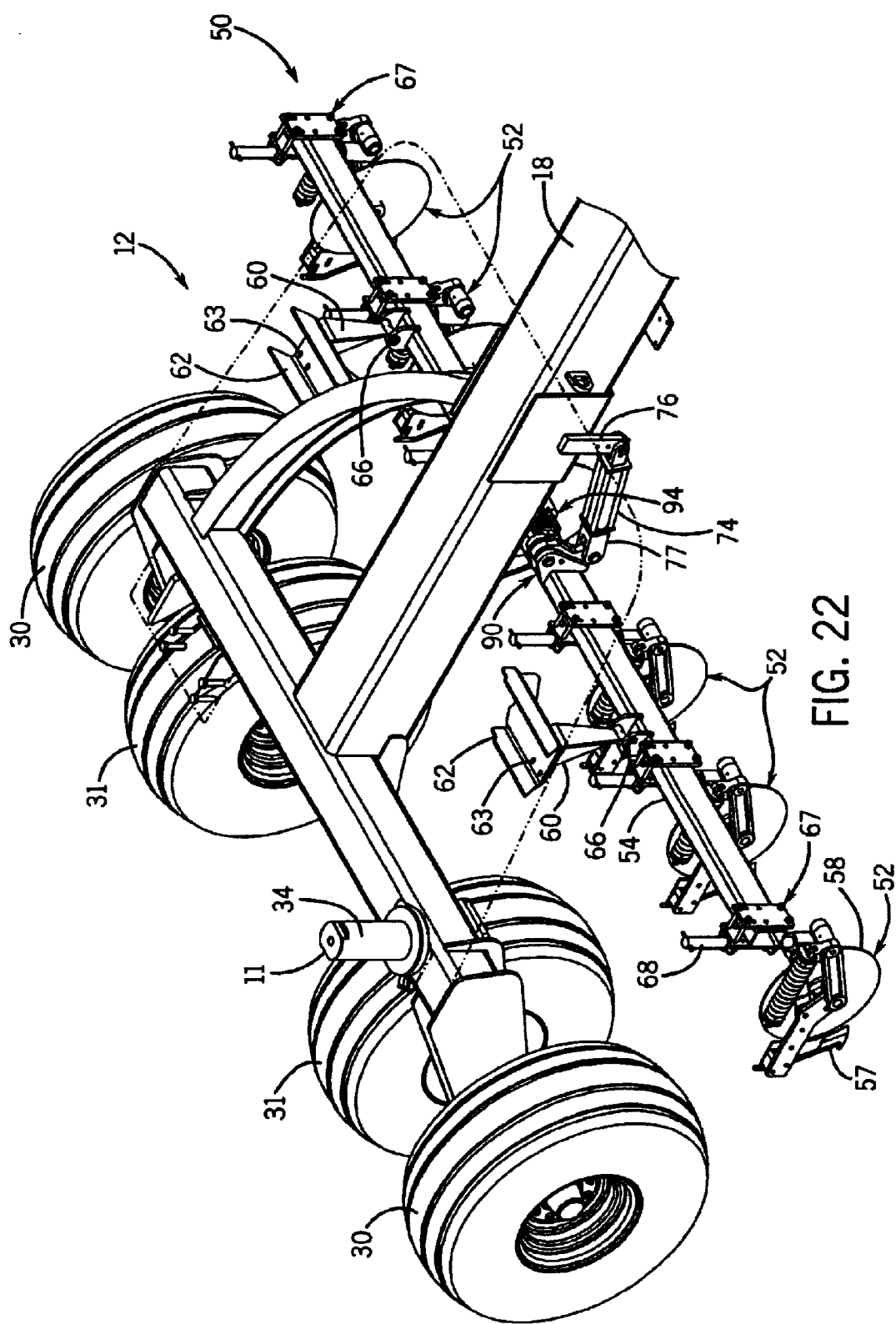
FIG. 22 is a schematic diagram similar to FIG. 11 above, albeit illustrating an assembly including a mechanical overload protection mechanism as opposed to a hydraulic protection mechanism.

Referring now to FIG. 20, to drive the cylinders 120, 122 and 74 into their retracted states so that the linked implement bar 16 and coulter bar 54 are driven down and into their functional, ground engaging and operating positions, valves 84a, 84b, 84c and 86a are all controlled to allow counter-clockwise fluid flow and the auxiliary tractor valve (not illustrated) is placed in a "lower" position to provide pressurized fluid at port 85b. When fluid is supplied at port 85b, fluid passes through check valve 84d and pressurized cylinders 120, 122 and 74 through lines 88a, 88b and 88c, respectively. As cylinders 120, 122 and 74 retract, fluid is returned through lines 87a, 87b and 87c, respectively, and through port 85a to the reservoir tank. Once the functional bar positions are attained, the tractor auxiliary valve of the planting apparatus (not shown) is placed in a "float" mode, which means that ports 85a and 85b are connected together through the auxiliary valve (not shown) and in turn are connected to a reservoir tank (also not shown).

During operation under normal loading conditions, pilot-operated check valve 84d prevents fluid from exiting the rod side of cylinder 74, as well as preventing fluid from exiting the rod side of lift cylinders 120 and 122. Check valve 84d enables cylinder 74 to act as a rigid link, withstanding the draft loads on coulter/fertilizer units 52.

Referring still to FIG. 20 and also to FIG. 10, coulter/fertilizer units 52 and ground engaging units 17 are raised simultaneously by setting the tractor auxiliary valve (not shown) to a "raise" position to apply hydraulic pressure at port 85a and by controlling the system valves to allow clockwise fluid flow. When pressure is applied at port 85a, lift cylinders 120 and 122 are extended by pressure through lines 87a and 87b, coulter cylinder 74 is extended by pressure through line 87c, pressure through pilot line 87d primes check valve 84d which is opened so that hydraulic fluid is permitted to flow from cylinders 120, 122 and 74, through lines 88a, 88b and 88c, respectively, through open check valve 84d and out port 85b to return into the reservoir tank.

When fertilization is not required, it is desirable to raise and lower cylinders 120 and 122 while holding coulter bar 54 and attached coulter/fertilizer units 52 in the raised and ground clearing position. This is accomplished by deactivating solenoid valve 86a when coulter cylinder 74, and lift cylinders 120 and 122 are in the extended or raised positions. Cylinder 74 is effectively locked while cylinders 120 and 122 are allowed to extend and retract freely. Reenergized solenoid valve 86a causes coulter apparatus 50 to raise and lower simultaneously with implement bar 16.

Referring to FIGS. 18, 20 and 21, when in the lowered, or functional position, when one or more central coulter members 58 encounters substantial resistance from an obstruction 58b, an extending force is applied in the direction of arrow 169 on the rod end of cylinder 74. This force causes increased pressure in lines 88c and 78a. Sufficient force causes a threshold pressure to be exceeded in pilot line 78c, opening pressure relief valve 80, permitting fluid to flow from the rod side of cylinder 74, through lines 78b and 87c, and through valves 86a, 84b and 84a, and into the tractor's reservoir tank. As the rod of cylinder 74 extends, coulter bar 54 is lifted out of the ground, reducing the load on coulter bar 54 and avoiding possible damage to coulter assembly 50.

To reset coulter bar 54 in the functional position, the operator moves the tractor's auxiliary valve (not shown) from the "float" position to the "lower" position, supplying pressure to retract cylinder 74 in the manner described above. The tractor's auxiliary valve is then moved back to the "float" position for continued operation.

Referring now to FIGS. 22 through 28, a mechanical coulter overload protection embodiment is illustrated. The mechanical embodiment includes many of the components described above and therefore, in the interest of simplifying this explanation, components that are similar or identical to those described above will not be described again here in detail. Generally, the mechanical overload mechanism includes a mechanical component or locking member that maintains the spatial relationship between at least two linkage components where each of the coulter bar, the carrier frame and the coulter cylinder are linkage components. The mechanical component is designed so that it will fail when a secondary force applied thereto exceeds a threshold force level where, as above, the threshold level is selected to be less than a force likely to cause damage to the coulter/fertilizer units. When the mechanical component fails, the coulter bar and components secured thereto, as in the case of the hydraulic overload protection system above, are essentially free to move, under the force of an obstruction, toward the transport position thereby reducing the likelihood of damage to the coulter/fertilizer units.

Figure 23:
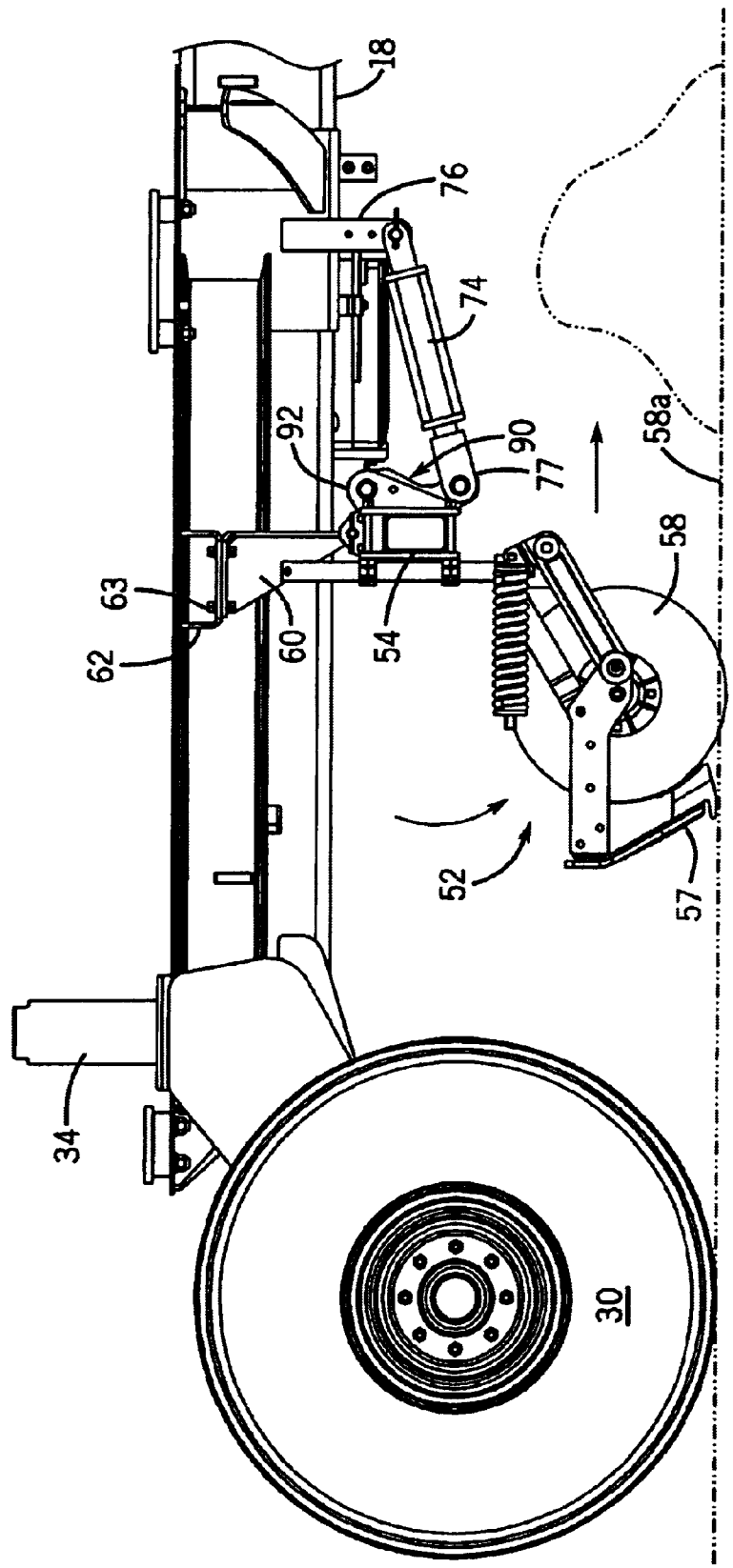
FIG. 23 is similar to FIG. 12 above, albeit illustrating the mechanical overload protection mechanism.
Figure 24:
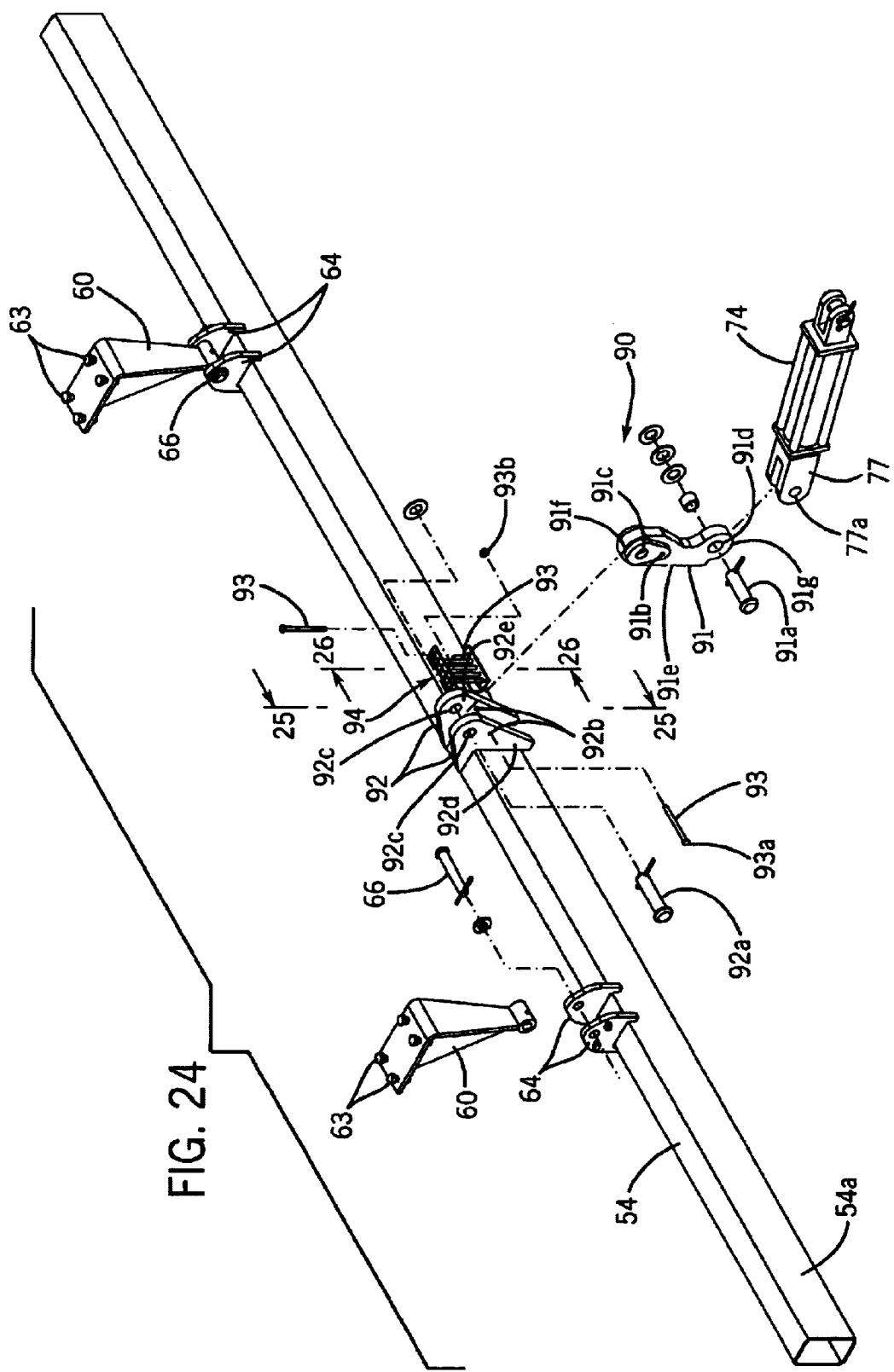
FIG. 24 is an exploded view of a coulter bar and mechanical overload protection mechanism.
Figure 25:
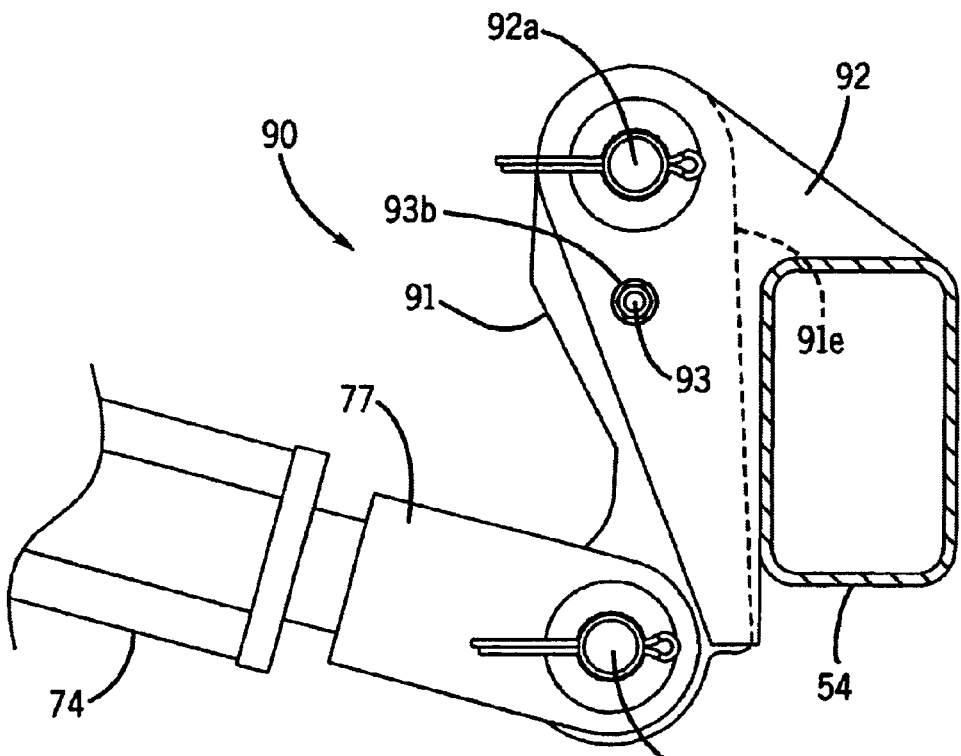
FIG. 25 is similar to FIG. 14 above, albeit illustrating a mechanical overload protection mechanism taken along the line 25—25 of FIG. 24.

Referring specifically to FIGS. 23 through 25, the mechanical overload system includes, among other linking components (e.g., bolts, nuts, etc.), a specially designed clevis 92, a mechanical arm member 91 and a mechanical failure component 93. Arm member 91 is generally elongated extending between first and second ends 91f and 91g, respectively, and defines three separate apertures including first, second and third apertures 91c, 91d and 91b, respectively. Apertures 91c and 91d are formed at opposite ends of arm member 91 and are sized to receive pivot pins 92a and 91a in a manner described in more detail below. In the illustrated embodiment, aperture 91b is formed between apertures 91c and 91d but relatively more proximate aperture 91b and is relatively smaller then each of apertures 91c and 91d. In addition, referring specifically to FIG. 25, arm member 91 forms a rear edge or limiting surface 91e that is essentially flat. Aperture 91b forms a bearing surface (not separately numbered) that, as its label implies, bears against another member (e.g., pin 93) during operation. In the illustrated embodiment, referring again to FIG. 24, the bearing surface of aperture 91b faces essentially in the same direction as limiting surface 91e.

A clevis 77 formed at the end of coulter cylinder 74 includes two facing plates that are separated by a space for receiving second end 91g of arm member 91 and the plates form an aperture pair 77a (only one aperture in the pair numbered) that aligns with aperture 91d when the end of arm member 91 is received between the plates. With the end of member 91 positioned between the clevis 77 plates, a pin 91a is placed through aperture pair 77a and aperture 91d and is secured therein via a cotter pin or the like.

Clevis 92 includes first and second separated plates 92d and 92e that extend generally upward and in the transport direction from coulter bar 54 when bar 54 is in the functional position. The clevis plates 92d and 92e are separated such that the space there between is sufficient to receive first end 91f of arm member 91. Clevis 92 forms two separate aperture pairs, each pair including axially aligned apertures in each of the clevis plates. The first aperture pair 92c is provided to receive a first pivot pin 92a that also passes through aperture 91c in arm member 91 to lock member 91 to clevis 92. Pin 92a can be locked in place via a cotter pin or the like.

The second aperture pair formed by clevis 92 includes an axially aligned aperture pair having dimensions similar to those of aperture 91b in arm member 91. Second pair 92b is formed in clevis 92 such that pair 92c is below corresponding apertures in the first pair 92c when coulter bar 54 is in the functional position (see again FIG. 25). In addition, the spacing between each aperture in second pair 92b and a corresponding aperture in first pair 92c is identical to the spacing between apertures 91b and 91c in arm member 91. Moreover, bar 54 forms a second limiting surface 54a (see FIG. 24) and apertures 91b and 91C are formed with respect to limiting surface 91e so that, when arm 91 is mounted to clevis 92 via pin 92a and is forced backward so that limiting surfaces 91e and 54a contact, aperture pair 92b and aperture 91b are aligned.

Pin 93 is sized to fit through aperture pair 92b and aperture 91b and includes a head 93a that limits travel of pin 93 through aperture pair 92b and a distal end that receives a nut member 93b for locking pin 93 in place. Pin 93 is constructed so as to have a relatively less robust design than either of pins 92a and 91 a and so that pin 93 will generally fail and snap in pieces when a pressure thereon exceeds a threshold pressure that is below a pressure that may damage a coulter member 58 there below.

Figure 26:
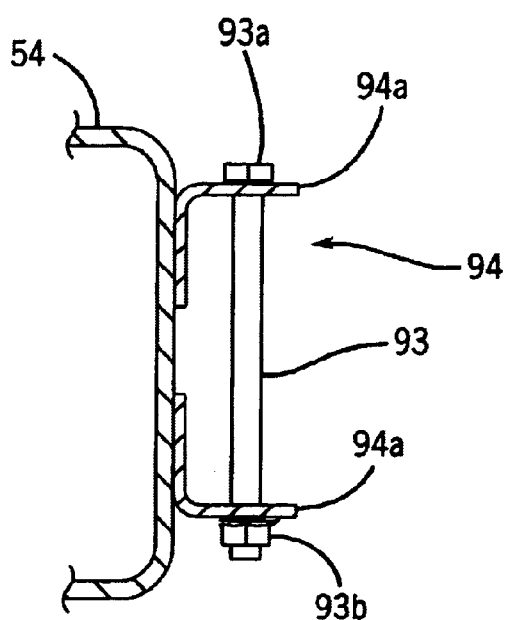
FIG. 26 is a cross-sectional view taken along the line 26—26 of FIG. 24.

Referring to FIGS. 24 and 26, a pin storage assembly 94 is provided that includes brackets welded to coulter bar 54 and a plurality of additional pins 93 and nuts 93b that cooperate to secure the pins to the brackets. The additional pins 93 and nuts 93b are useable in cases where a pin is destroyed during operation to re-enable the coulter assembly.

With arm member 91 secured to each of clevis 92 and clevis 77 as described above, bar 54 and cylinder 74 are moved such that aperture pair 92b and aperture 91b are aligned (i.e. until rear edge 91e of arm member 91 contacts bar 54). Thereafter, a pin 93 is slid through the aligned apertures and a nut 93b is secured to the distal pin end. This general configuration is illustrated best in FIG. 23.

Figure 28:
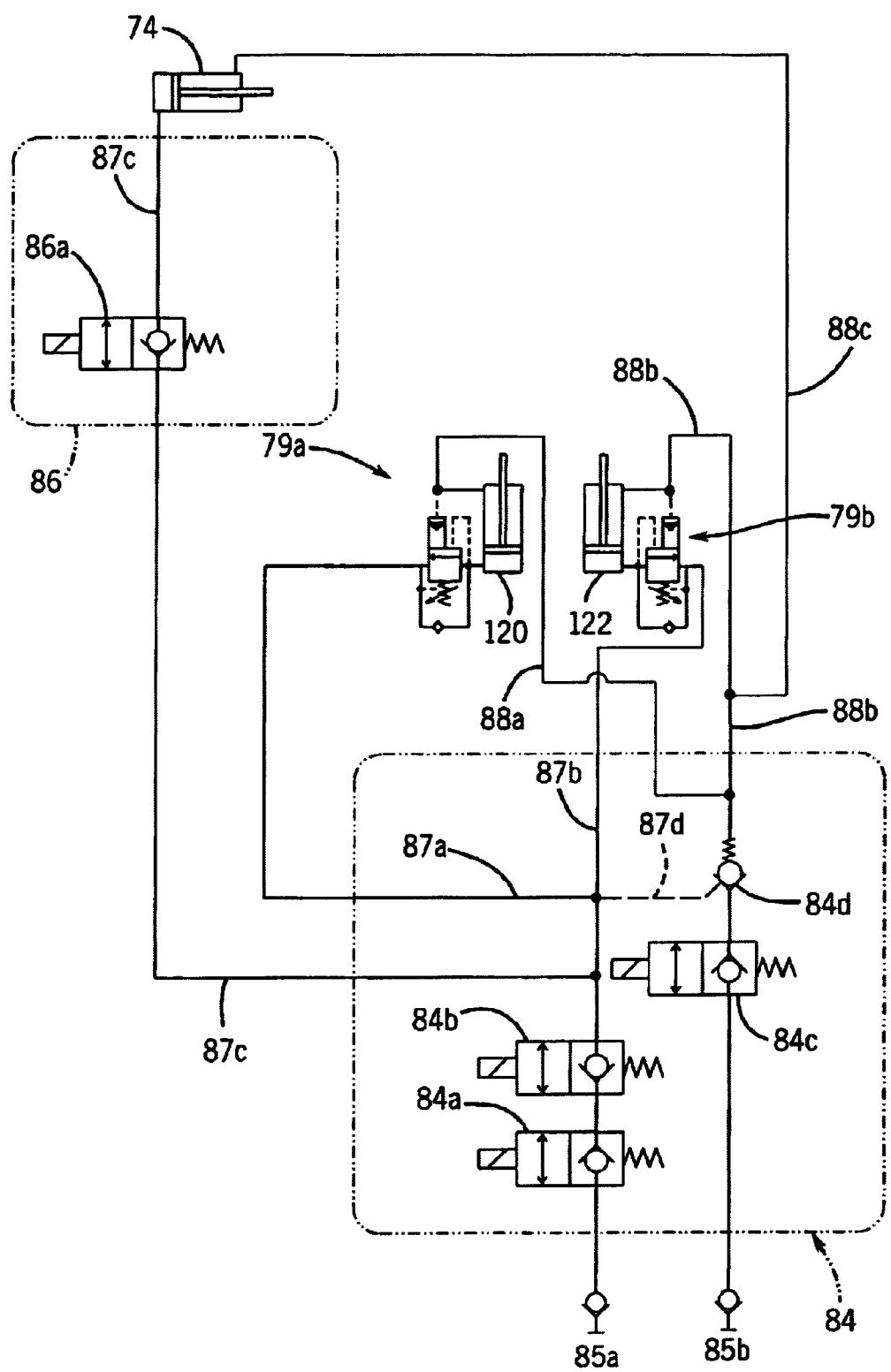
FIG. 28 is similar to FIG. 19, albeit illustrating a hydraulic system used in conjunction with the mechanical overload protection system.

Referring now to FIG. 28, the hydraulic plumbing used with the mechanical overload system described above is similar to the hydraulic plumbing described above in the context of the hydraulic overload protection system, the one difference being that there is no relief valve 80. Thus, the coulter valve assembly 86 only includes a solenoid valve 86a linking the outlet of valve 84b to the base side of cylinder 74 and the rod side of cylinder 74 is linked to the rod sides of lift cylinders 120 and 122. Because of the similarity between the system of FIG. 28 and the system of FIG. 19 above, other system components will not be described again here in detail.

Once pin 93 is received in aligned apertures 92b and 91b and is secured therein, the mechanical overload system described above operates in a fashion similar to the hydraulic overload system during normal operation. To this end, to raise the coulter bar 54 and components attached thereto into the transport position (see FIG. 17), pressurized fluid is provided at port 85a and to lower the coulter bar and components attached thereto to the functional and ground engaging position (see FIG. 23) pressurized fluid is provided at port 85b.

Figure 27:
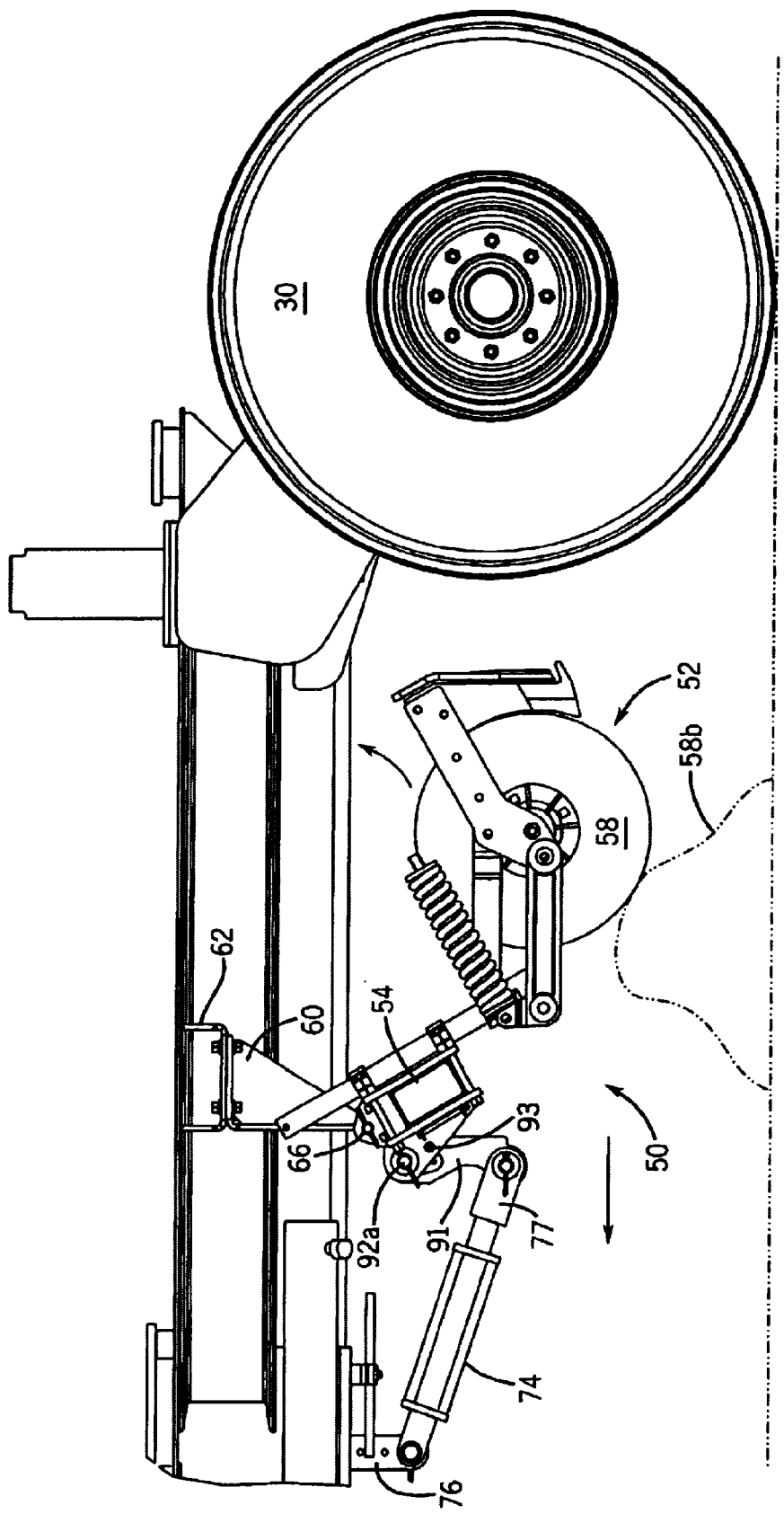
FIG. 27 is similar to FIG. 18, albeit illustrating the mechanical overload protection system where a mechanical linking pin has been destroyed.

Referring to FIGS. 23 and 27, with the coulter bar and coulter/fertilizer units 52 mounted thereto in the functional position, when an obstruction 58b is encountered by one or more of the units 52, the obstruction 58b applies a force on the bar 54 and therefore on the pin 93. When the applied force is less than the threshold force required to snap pin 93 into pieces, the pin 93 remains intact and maintains the coulter/fertilizer units 52 in their functional positions. However, where the applied force exceeds the threshold force, pin 93 snaps into pieces and clevis 92 and bar 54 secured thereto pivot about pin 92a so that arm member 91 extends essentially horizontally between pins 91a and 92a. When arm 91 extends horizontally, the bar 54 and mounted components are forced up and toward the transport position illustrated in FIG. 17.

After a pin 93 is destroyed, to re-link the overload system for subsequent operation, one of the additional pins 93 is removed from the additional pin assembly 94 (see FIGS. 24 and 26), the apertures 92b and 91b are realigned by extending cylinder 74 and the additional pin is inserted and secures within the aligned apertures. Thereafter normal operation can again commence.

While the drawings, specific examples, and particular formations given describe exemplary embodiments, they serve the purpose of illustration only. The materials and configurations shown and described may differ depending on the chosen performance characteristics and physical characteristics of the planter equipment. For example, the type of planter equipment may differ. For example, while the embodiments described include a coulter cylinder mounted on the transport direction side of the coulter bar 54, other embodiments may include the cylinder mounted on the other side of the bar 54. In these cases at least some embodiments do not even include a coulter cylinder. Moreover, any type of overload protection system for a centrally mounted coulter/fertilizer apparatus is contemplated. Furthermore, while the overload protection mechanism is described as being between the coulter cylinder and the bar, the mechanism may be provided at other locations along the linage path. For instance, the overload mechanism may operate between the cylinder and the carrier frame. Moreover, in the case of the mechanical overload mechanism, the locking pin may be locked via apertures in the cylinder mounted clevis (see 7 in FIG. 24) as opposed to in the bar mounted clevis 92. Other substitutions, modifications, changes, and omissions may be made in the design, operating conditions, and arrangement of the exemplary embodiments without departing from the spirit of the invention as expressed in the appended claims.

What is claimed is:

1. A coulter apparatus for use with a planter assembly constructed to move in a transport direction where the planter assembly includes support wheels mounted to the underside of a carrier frame and row units linked to the carrier frame and generally disposed on a side of the support wheels opposite the transport direction, the apparatus comprising:

a coulter bar pivotally mounted to the underside of the carrier frame so that the coulter bar can be pivotally moved relative to the underside of the carrier frame; and a separate coulter/fertilizer unit mounted to the coulter bar and aligned with each one of the row units on a side of the support wheels opposite the row units, the coulter bar allowing for pivotal movement of the coulter/fertilizer units relative to the underside of the carrier frame for movement between a transport position where the coulter/fertilizer units are above the ground and a functional position where the coulter/fertilizer units engage the ground.

2. The apparatus of claim 1 wherein the coulter/fertilizer units are essentially equi-spaced.

3. The apparatus of claim 1 further including a hydraulic cylinder mounted to the carrier frame and including a rod mounted to the coulter bar, the cylinder for moving the coulter bar between the upright and downward positions.

4. The apparatus of claim 3 wherein the row units are linked to the carrier frame for pivotal movement between transport and functional positions, the hydraulic cylinder is a first cylinder and the planter assembly further includes a second hydraulic cylinder linked between the carrier frame and the row units for moving the row units between the functional and transport positions and, wherein, the first and second cylinders are plumbed in parallel so that the coulter/fertilizer bar and row units essentially simultaneously move between the functional and transport positions.

5. The apparatus of claim 3 wherein the cylinder is mounted to the carrier frame on a side of the coulter bar opposite the support wheels and the coulter bar pivots toward the support wheels when moving from the functional to the transport positions.

6. The apparatus of claim 5 wherein the support wheels define a support dimension, the coulter bar has a length dimension that is similar to the support dimension.

7. The apparatus of claim 6 wherein the planter assembly further includes an implement bar having a length dimension that is greater than the support dimension, the implement bar mounted to the carrier frame such that ends of the implement bar extend laterally past the wheels, implement bar portions extending past the wheels being lateral bar segments and the implement bar portion adjacent the support dimension being a central bar segment, the row units mounted to the implement bar and including central and lateral row units mounted to the central and lateral bar segments, respectively, the planter assembly further including a separate coulter/fertilizer unit mounted to each of the lateral row units on a side facing the coulter bar, the coulter/fertilizer units mounted to the coulter bar including only one unit corresponding to each of the central row units.

8. The apparatus of claim 7 wherein the implement bar is pivotally mounted to the carrier frame such that the implement bar is pivotable between an operating position where the implement bar is perpendicular to the transport direction and a transport position wherein the implement bar is parallel to the transport position.

9. A planter assembly constructed to move in a transport direction, the assembly comprising:

a carrier frame;

support wheels mounted to the underside of the carrier frame along a single axis and defining a support dimension along the single axis;

an implement bar having a length dimension that is greater than the support dimension and mounted to the carrier frame generally rearward of the axis with respect to the transport direction such that ends of the implement bar extend laterally past the wheels, implement bar portions extending past the wheels being lateral bar segments and the implement bar portion adjacent the support dimension being a central bar segment;

row units including central and lateral row units mounted to the central and lateral segments of the implement bar, respectively;

a separate coulter/fertilizer unit mounted to each of the lateral row units forward of the axis with respect to the transport direction;

a coulter bar mounted to the underside of the carrier frame forward of the axis with respect to the transport direction; and a separate coulter/fertilizer unit corresponding to each of the central row units mounted to the coulter bar and aligned with a corresponding central row unit.

10. The assembly of claim 9 wherein the coulter bar is mounted to the carrier frame for pivotal movement between a functional position where the coulter/fertilizer units are juxtaposed for ground engagement and a transport position wherein the coulter/fertilizer units are positioned above the ground.

11. The assembly of claim 10 further including a hydraulic cylinder mounted between the coulter bar and the carrier frame for moving the coulter bar between the functional and transport positions.

12. The assembly of claim 11 wherein the cylinder is mounted to the carrier frame on a side of the coulter bar opposite the support wheels.

13. The assembly of claim 11 wherein the implement bar is mounted to the carrier frame for pivotal movement between a functional position where the row units are juxtaposed for ground engagement and a transport position wherein the row units are positioned above the ground, the cylinder being a first hydraulic cylinder, the assembly further including a second hydraulic cylinder mounted between the implement bar and the carrier frame for moving the implement bar between the functional and transport positions.

14. The apparatus of claim 13 wherein the first and second cylinders are plumbed in parallel.

15. The assembly of claim 9 wherein the implement bar is mounted to the carrier frame for pivotal movement between a transport position where the implement bar is parallel to the transport direction and an operating position where the implement bar is perpendicular to the transport position.

16. A planter assembly constructed to move in a transport direction, the assembly comprising:

a carrier frame;

support wheels mounted to the underside of the carrier frame along a single axis;

row units linked to the carrier frame on a side of the support wheels opposite the transport direction; and a separate coulter/fertilizer unit corresponding to each of the row units pivotally linked to the underside of the carrier frame on a side of the support wheels opposite the row units for movement between a functional position where the coulter/fertilizer units engage the ground and a transport position where the coulter/fertilizer units are above the ground; and a hydraulic cylinder mounted to the carrier frame and linked to the coulter/fertilizer units for moving the coulter/fertilizer units between the functional and transport positions.

17. The assembly of claim 16 wherein the row units are linked to the carrier frame for pivotal movement between transport and functional positions, the hydraulic cylinder is a first cylinder and the planter assembly further includes a second hydraulic cylinder linked between the carrier frame and the row units for moving the row units between the functional and transport positions and, wherein, the first and second cylinders are plumbed in parallel so that the coulter/fertilizer bar and row units essentially simultaneously move between the functional and transport positions.

* * * * *